(12) United States Patent
Yoshida

(10) Patent No.: US 10,365,866 B2
(45) Date of Patent: Jul. 30, 2019

(54) COMMUNICATION PROCESSING SYSTEM, PROCESSING DEVICE, AND NON-TRANSITORY RECORDING MEDIUM FOR COMPUTER READABLE PROGRAM

(71) Applicant: Konica Minolta, Inc., Chiyoda-ku, Tokyo (JP)

(72) Inventor: Okihisa Yoshida, Kawanishi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/447,990

(22) Filed: Mar. 2, 2017

(65) Prior Publication Data

US 2017/0255423 A1    Sep. 7, 2017

(30) Foreign Application Priority Data

Mar. 4, 2016    (JP) .................................. 2016-041720

(51) Int. Cl.
*G06F 15/00*    (2006.01)
*G06F 3/12*    (2006.01)
(Continued)

(52) U.S. Cl.
CPC .......... *G06F 3/1222* (2013.01); *G06F 3/1238* (2013.01); *G06F 3/1292* (2013.01);
(Continued)

(58) Field of Classification Search
CPC .... G06F 3/1222; G06F 3/1238; G06F 3/1292; G06F 21/448; G06F 21/608;
(Continued)

(56) References Cited

U.S. PATENT DOCUMENTS

| 8,068,607 B2* | 11/2011 | Oshima ................. G06F 21/608 |
| | | 380/270 |
| 2015/0186670 A1* | 7/2015 | Noda .................... G06F 21/552 |
| | | 713/193 |

(Continued)

FOREIGN PATENT DOCUMENTS

| JP | 2005-217648 A | 8/2005 |
| JP | 2011-034310 A | 2/2011 |
| JP | 2015-119322 A | 6/2015 |

*Primary Examiner* — Mark R Milia
(74) *Attorney, Agent, or Firm* — Buchanan Ingersoll & Rooney PC

(57) ABSTRACT

The first processing device includes a first communication unit for performing cryptographic communication and plaintext communication, a determination portion for determining whether to set the cryptographic communication, and a communication unit controller. The second processing device includes a second communication unit for performing the cryptographic communication and the plaintext communication with the first communication unit. The second communication unit includes a storage for storing, for each of other ends of communication, encryption key information necessary for encryption up to a predetermined upper limit. When performing the cryptographic communication, the second communication unit performs at least one of encryption and decryption based on an encryption key included in the encryption key information corresponding to the first processing device stored in the storage. After finishing the cryptographic communication, the second communication unit performs processing for deleting, from the storage, the encryption key information corresponding to the first processing device.

22 Claims, 19 Drawing Sheets

(51) Int. Cl.
*G06F 21/60* (2013.01)
*H04L 9/08* (2006.01)
*H04L 29/06* (2006.01)
*H04N 1/00* (2006.01)
*H04N 1/44* (2006.01)
*G06F 21/44* (2013.01)
*H04W 12/02* (2009.01)
*H04W 12/04* (2009.01)

(52) U.S. Cl.
CPC .......... *G06F 21/445* (2013.01); *G06F 21/608* (2013.01); *H04L 9/0894* (2013.01); *H04L 9/0897* (2013.01); *H04L 63/0428* (2013.01); *H04L 63/06* (2013.01); *H04N 1/00103* (2013.01); *H04N 1/4433* (2013.01); *H04W 12/02* (2013.01); *H04W 12/04* (2013.01); *H04L 2209/80* (2013.01); *H04N 2201/0041* (2013.01); *H04N 2201/0055* (2013.01); *H04N 2201/0094* (2013.01)

(58) Field of Classification Search
CPC ... H04L 9/0894; H04L 63/0428; H04L 63/06; H04N 1/00103; H04N 1/4433; H04W 12/02; H04W 12/04
USPC ......................................................... 358/1.15
See application file for complete search history.

(56) References Cited

U.S. PATENT DOCUMENTS

2015/0324593 A1* 11/2015 Abuelsaad ............ H04W 12/02 713/152
2016/0128119 A1* 5/2016 Maheshwari ....... H04W 76/023 370/329

* cited by examiner

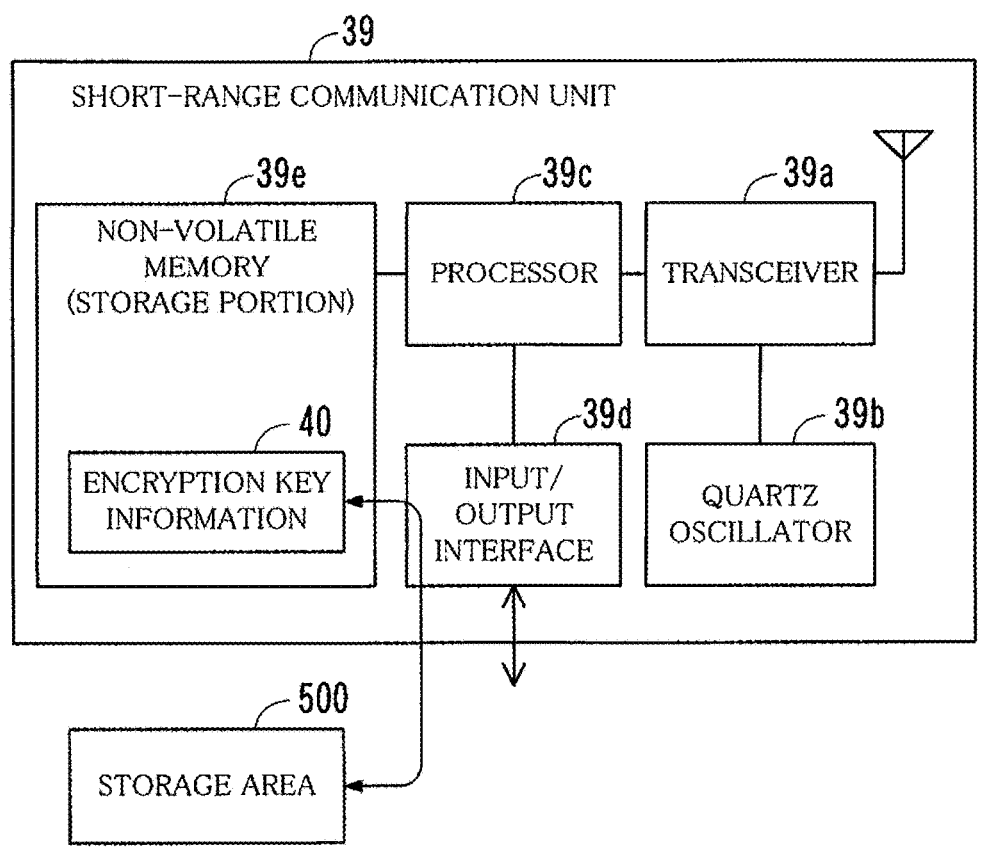

FIG. 8(A) BEFORE CONNECTION
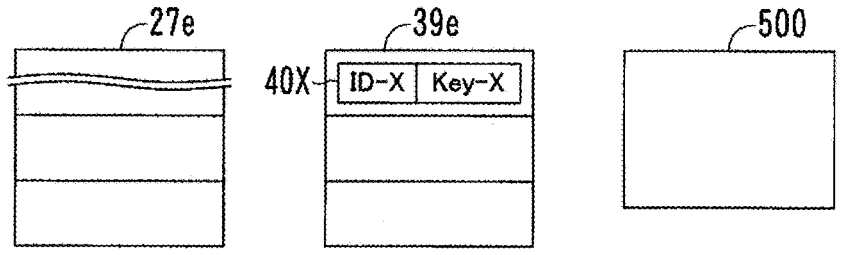
FIG. 8(B) PAIRING
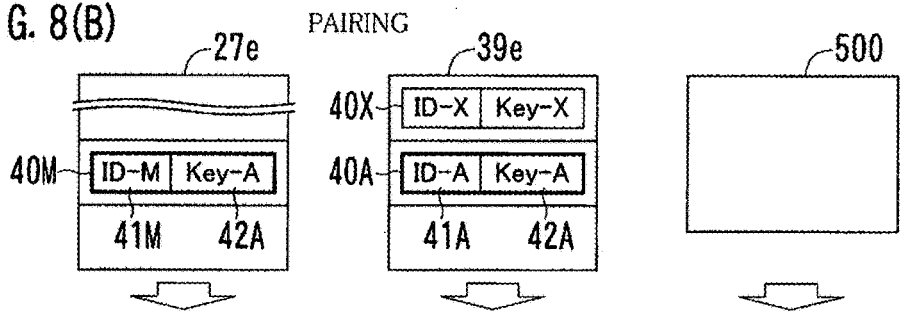
FIG. 8(C) MOVE ENCRYPTION KEY INFORMATION
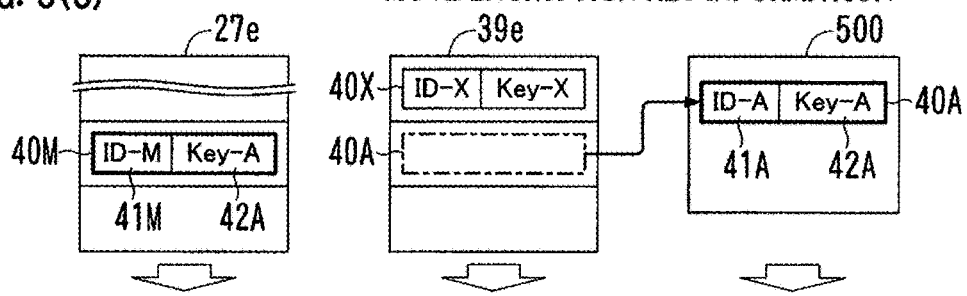
FIG. 8(D) WRITE AGAIN ENCRYPTION KEY INFORMATION
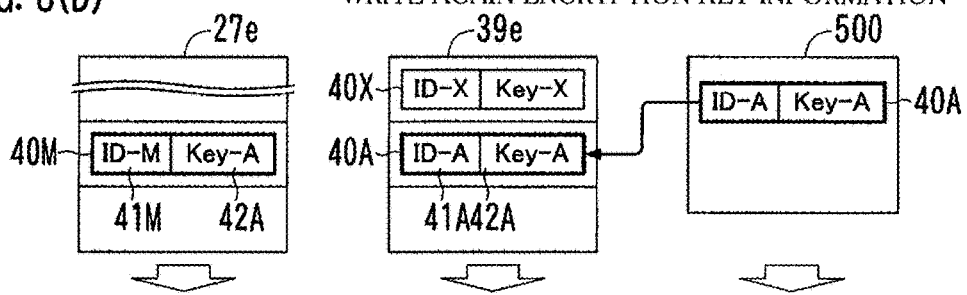
FIG. 8(E) AFTER DISCONNECTION
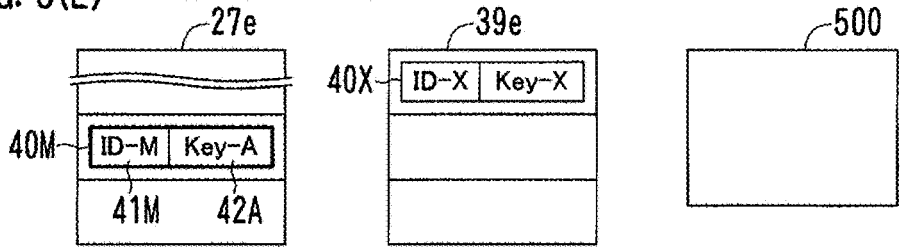

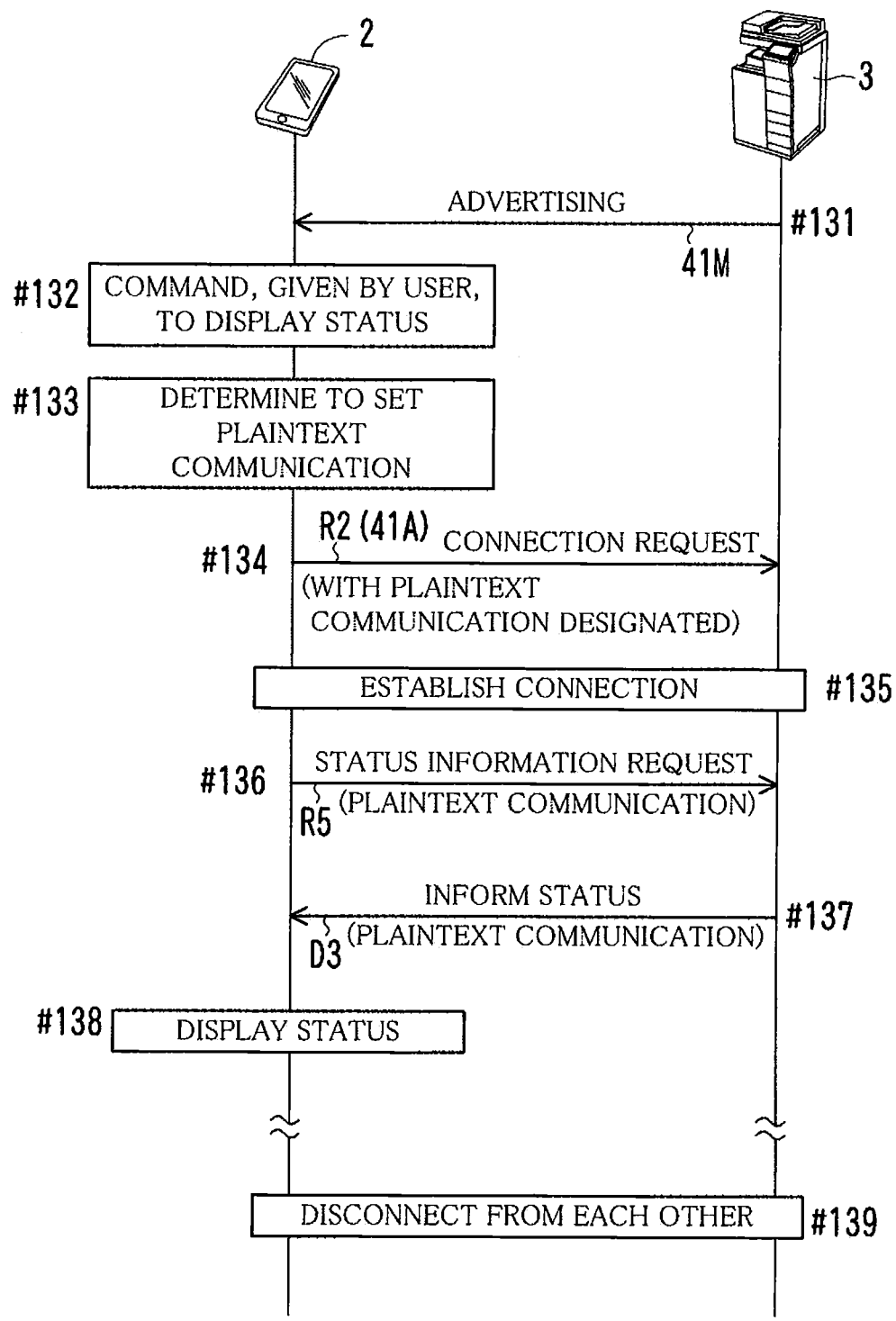

FIG. 10(A) BEFORE CONNECTION
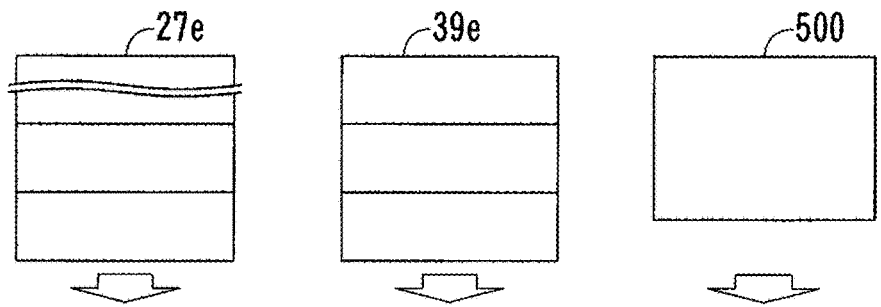
FIG. 10(B) CONNECTION ESTABLISHED
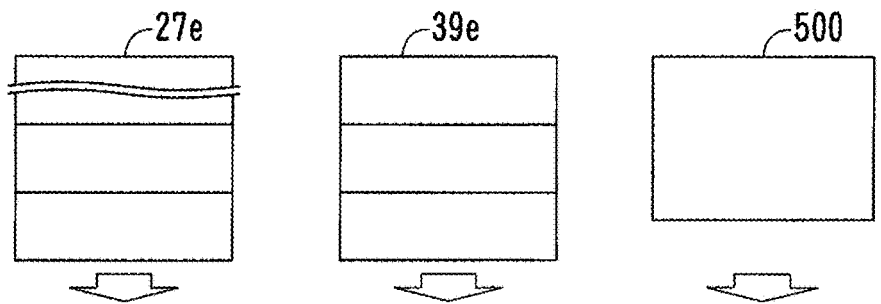
FIG. 10(C) AFTER DISCONNECTION
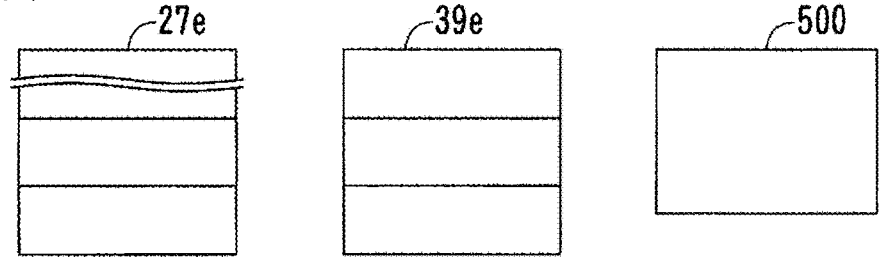

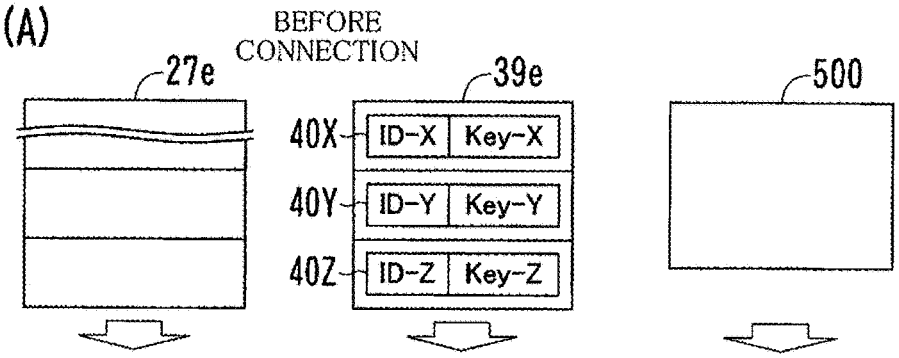
FIG. 13(A) BEFORE CONNECTION
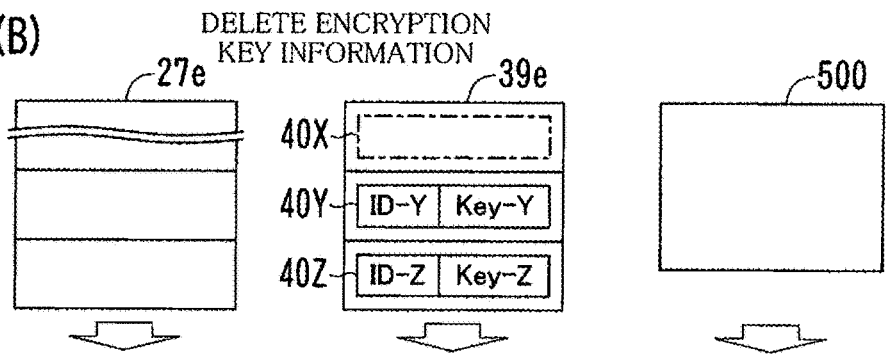
FIG. 13(B) DELETE ENCRYPTION KEY INFORMATION
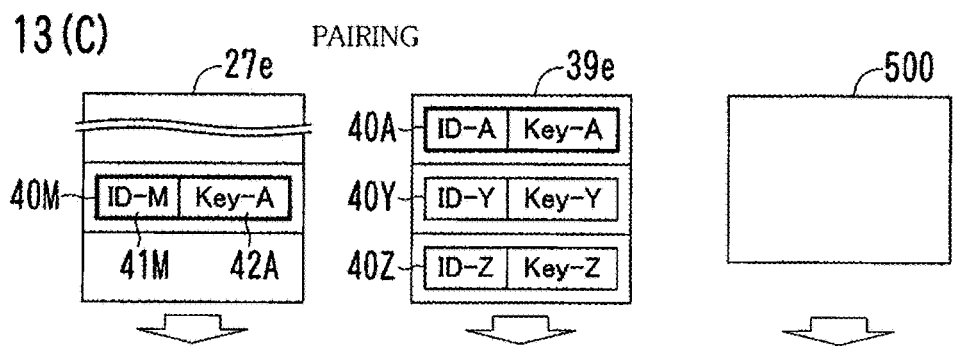
FIG. 13(C) PAIRING
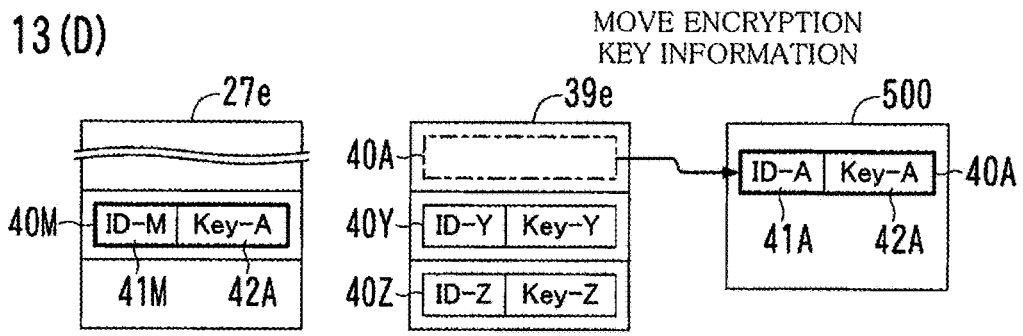
FIG. 13(D) MOVE ENCRYPTION KEY INFORMATION

COMMUNICATION PROCESSING SYSTEM, PROCESSING DEVICE, AND NON-TRANSITORY RECORDING MEDIUM FOR COMPUTER READABLE PROGRAM The present U.S. patent application claims a priority under the Paris Convention of Japanese patent application No. 2016-041720 filed on Mar. 4, 2016, the entirety of which is incorporated herein by reference.

BACKGROUND OF THE INVENTION

1. Field of the Invention

The present invention relates to a communication processing system, a processing device, and a non-transitory recording medium for a computer readable program used therefor.

2. Description of the Related Art

In recent years, a variety of devices has performed short-distance wireless communication therebetween. For example, a mobile terminal such as a smartphone or a tablet PC sends and receives data on picture with a printer via Bluetooth (registered trademark). In such a case, the mobile terminal sends the data to the printer, and the printer prints a photograph based on the data received. In the communication via Bluetooth, ad-hoc communication is possible which allows devices sending and receiving data to directly communicate with each other without a relay device.

In the communication via Bluetooth, processing which enables devices performing communication with each other to share an encryption key, namely, pairing, is performed. Based on the encryption key, data is encrypted at a sending unit and the data is decrypted at a receiving unit. Once the pairing is performed, the encryption key is kept in each of the devices even after the communication therebetween is disconnected. In the ensuing connection, both the devices do not need to perform the pairing, and can perform cryptographic communication based on the encryption key that has already been shared.

Technologies for cryptographic communication based on Bluetooth include technologies described in Japanese Laid-open Patent Publication Nos. 2005-217648 and 2011-034310.

To be specific, the first publication discloses the following: When a host device finds out a client device located in a predetermined distance or shorter therefrom, the host device generates an authentication code, sets an access right to the authentication code, correlates the access right and the authentication code with each other, stores the resultant, and sends the authentication code to the client device to store the same thereinto. The technology enables the host device and the client device to share an encryption key without difficult operation by a user.

The second publication discloses a device which stores device information of the other end of the communication permanently or temporarily depending on the position at which the device is used.

In general, the number of pieces of information which can be stored is finite because of limitation of the capacity of a storage medium for storing information necessary for encryption. In other words, a device can perform cryptographic communication with an only limited number of other ends of the communication at one time. For this reason, a device in which the number of pieces of information stored reaches the upper limit is incapable of performing cryptographic communication with another device even if that another device attempts to perform the cryptographic communication with the device.

The technology described in the first publication takes no account of the limitation of the number of pieces of information to be stored. Thus, the technology of the first publication cannot solve the problem. The technology described in the second publication cannot solve the problem for the case where the number of pieces of device information saved permanently reaches the upper limit of the number of pieces of information to be saved.

SUMMARY

The present invention has been achieved in light of such an issue, and therefore, an object of an embodiment of the present invention is to reduce the occurrence of a situation in which cryptographic communication cannot be performed due to a limit to the number of pieces of information for encryption which can be stored.

To achieve at least one of the objects mentioned above, according to an aspect of the present invention, a communication processing system includes a first processing device; and a second processing device; wherein the first processing device and the second processing device are configured to perform wireless communication with each other. The first processing device includes a first communication unit configured to perform, as the wireless communication, cryptographic communication in which encryption and decryption are made based on an encryption key and plaintext communication in which neither encryption nor decryption is made, a determination portion configured to determine, based on content of data to be sent and received, whether or not communication using the first communication unit is set at the cryptographic communication, and a communication unit controller configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication. The second processing device includes a second communication unit configured to perform the cryptographic communication and the plaintext communication with the first communication unit of the first processing device, the second communication unit includes a storage portion configured to store encryption key information necessary for the encryption up to a predetermined upper limit of number of pieces, the encryption key information being provided for each of other ends of communication, when the second communication unit performs the cryptographic communication with the first communication unit, the second communication unit performs at least one of the encryption and the decryption based on an encryption key included in the encryption key information corresponding to the first processing device stored in the storage portion, and after the second communication unit finishes the cryptographic communication with the first communication unit, the second communication unit performs processing for deleting, from the storage portion, the encryption key information corresponding to the first processing device.

These and other characteristics and objects of the present invention will become more apparent by the following descriptions of preferred embodiments with reference to drawings.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIGS. 4A and 4B are diagrams showing an example of the hardware configuration of a short-range communication unit of a mobile terminal and an example of the hardware configuration of a short-range communication unit of a multifunction device, respectively;

FIGS. 8(A)-8(E) are transition diagrams showing an example of the state of a storage portion and a storage area for Case 1;

FIG. 9 is a sequence diagram depicting an example of the flow of processing for Case 2;

FIGS. 10(A)-10(C) are diagrams showing an example of the state of a storage portion and a storage area for Case 2;

FIGS. 13(A)-13(D) are transition diagrams showing an example of the state of a storage portion and a storage area for Case 3;

DESCRIPTION OF THE PREFERRED EMBODIMENTS

Hereinafter, an embodiment of the present will be described with reference to the drawings. However, the scope of the invention is not limited to the illustrated examples.

Figure 1:
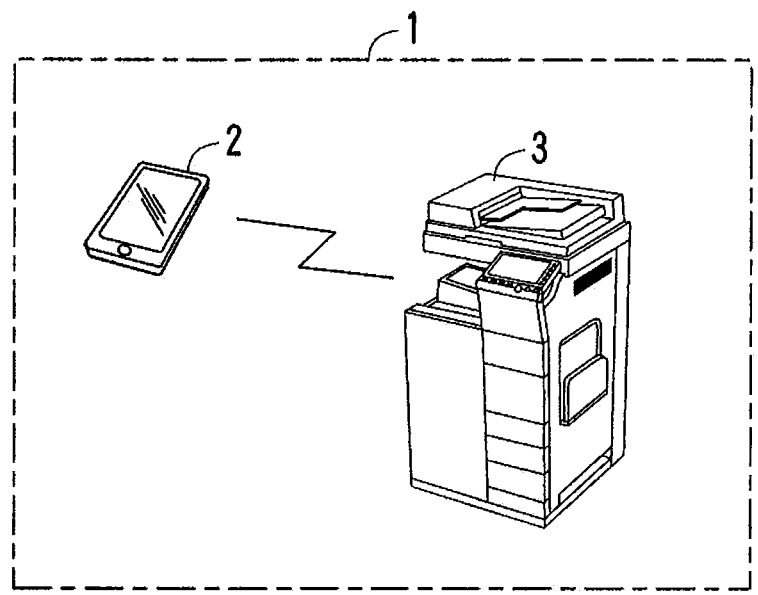
FIG. 1 is a diagram showing an example of the configuration of a communication processing system according to an embodiment of the present invention.

FIG. 1 shows an example of the configuration of a communication processing system 1 according to an embodiment of the present invention.

The communication processing system 1 is configured of a mobile terminal 2 serving as a first processing device and a multifunction device 3 serving as a second processing device. The mobile terminal 2 and the multifunction device 3 are configured to perform wireless communication with each other.

Examples of the mobile terminal 2 include a portable information device such as a smartphone, a tablet PC, a Personal Digital Assistant (PDA), and a wearable computer.

The mobile terminal 2 is configured to execute various processing of, for example, obtaining a document from the multifunction device 3 to display the same, causing the multifunction device 3 to print the document, and causing the multifunction device 3 to inform the mobile terminal 2 of a status (state of each portion and the progress of processing) of the multifunction device 3.

The multifunction device 3 of this embodiment is a Multi-functional Peripheral (MFP) into which functions of a copier, a printer, an image reader, a document server, and so on are integrated. The multifunction device 3 is configured to perform various processing of printing an image onto paper, of reading an image recorded on an original document, and of storing a document.

Figure 2:
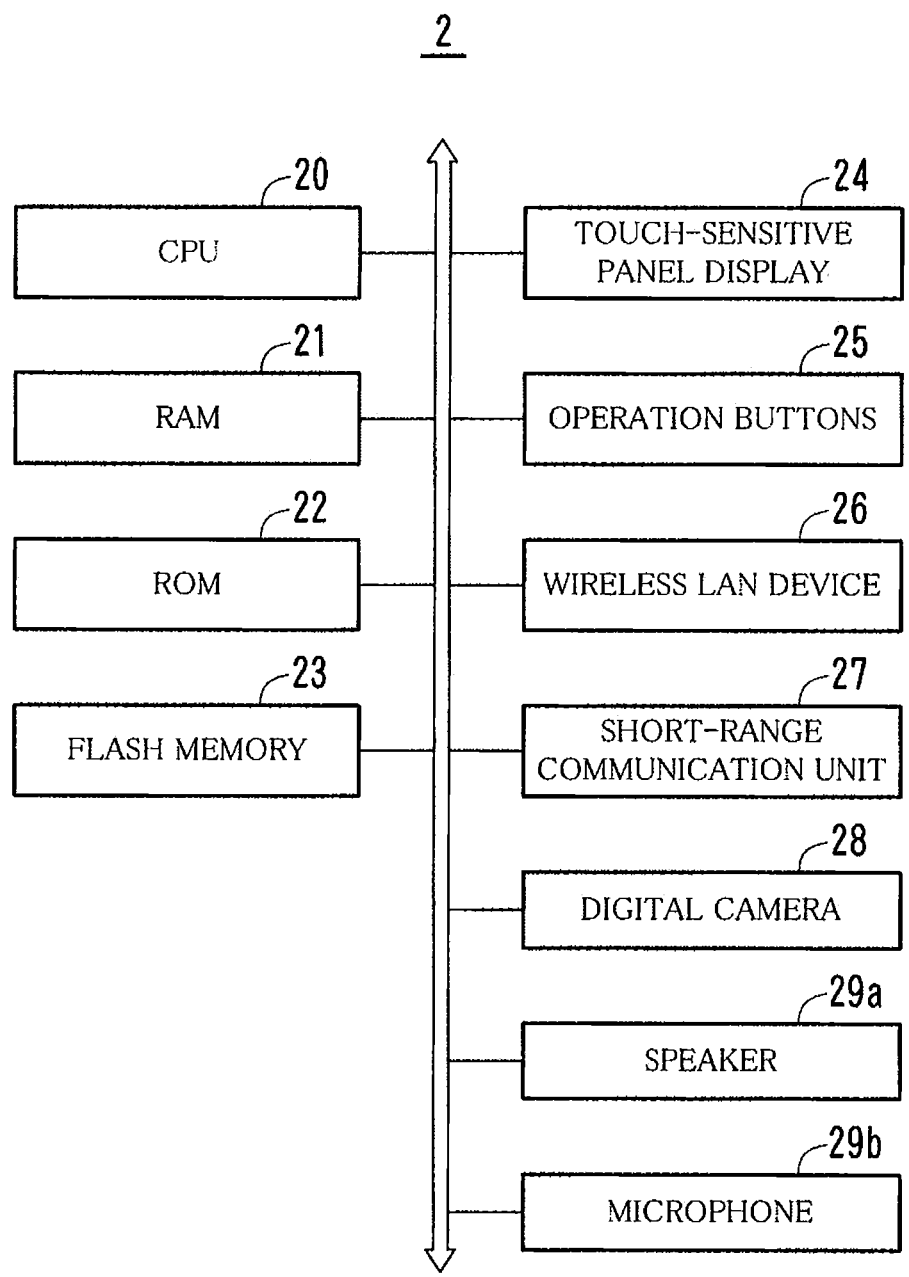
FIG. 2 is a diagram showing an example of the hardware configuration of a mobile terminal.
Figure 3:
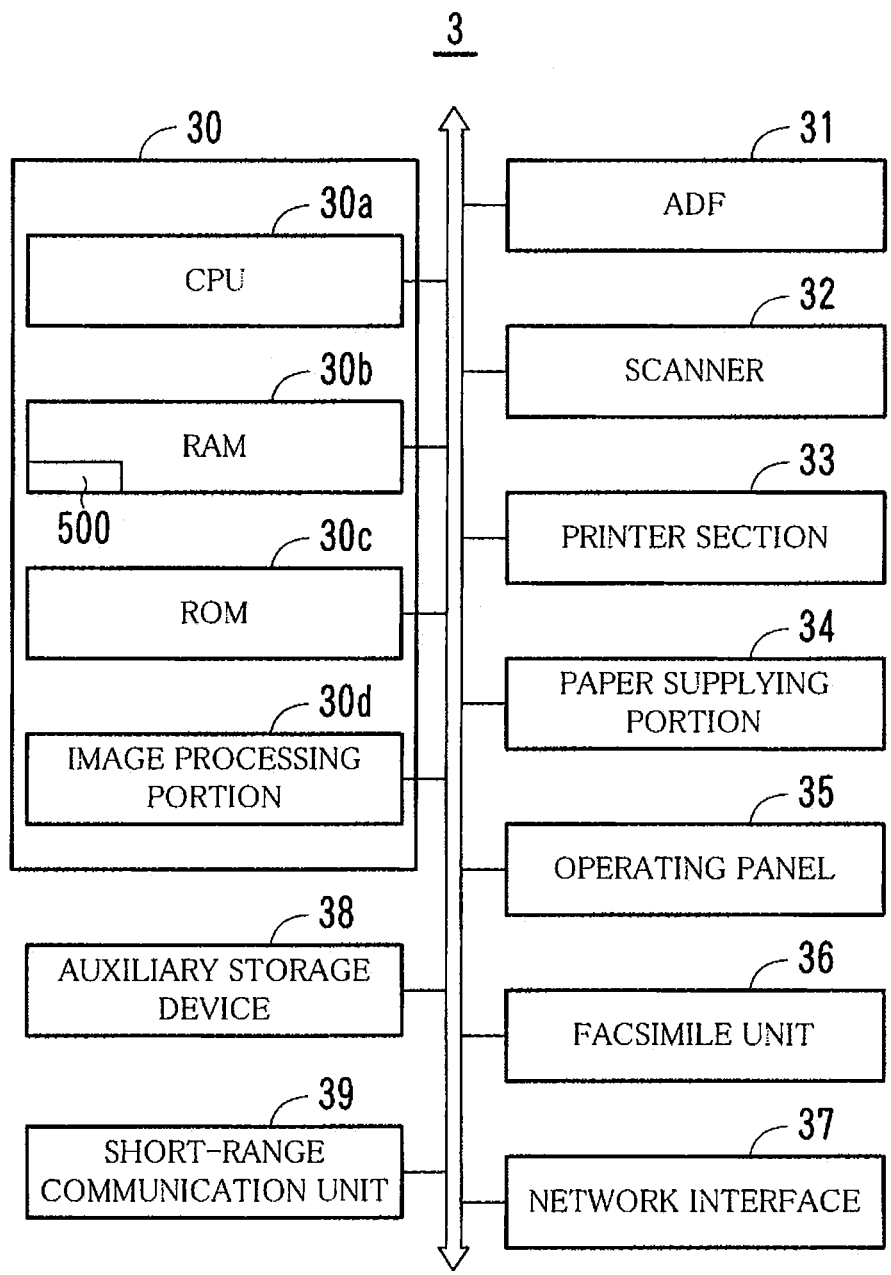
FIG. 3 is a diagram showing an example of the hardware configuration of a multifunction device.

FIG. 2 shows an example of the hardware configuration of the mobile terminal 2. FIG. 3 shows an example of the hardware configuration of the multifunction device 3.

Referring to FIG. 2, the mobile terminal 2 is configured of a Central Processing Unit (CPU) 20, a Random Access Memory (RAM) 21, a Read Only Memory (ROM) 22, a flash memory 23, a touch-sensitive panel display 24, operation buttons 25, a wireless LAN device 26, a short-range communication unit 27, a digital camera 28, a speaker 29a, a microphone 29b, and so on.

The touch-sensitive panel display 24 displays, for example, a screen for presenting messages to a user, a screen for allowing the user to input commands or information, and so on. In particular, in processing of informing the user of a status of the multifunction device 3, the touch-sensitive panel display 24 displays a status informed by the multifunction device 3. The touch-sensitive panel display 24 also detects a location touched by the user and informs the CPU 20 of the touched location.

The operation buttons 25 include a button for returning to a start screen, a button for confirming the content of user entry, a button for controlling sound volume, and a button for switching between ON and OFF of the power source.

The wireless LAN device 26 performs communication with the multifunction device 3 and the like through a wireless base station in accordance with a protocol such as Transmission Control Protocol/Internet Protocol (TCP/IP).

The short-range communication unit 27 is herein a module for Bluetooth Low Energy (LE), for example, a BLE chip. The short-range communication unit 27 performs wireless communication with a device, e.g., the multifunction device 3. Instead of this, however, the short-range communication unit 27 may perform communication meeting standards other than those for Bluetooth Low Energy. The wireless communication by the short-range communication unit 27 with the multifunction device 3 or another device include: cryptographic communication in which encryption and decryption are performed based on an encryption key 42 described below; and plaintext communication in which neither encryption nor decryption are performed. The configuration of the short-range communication unit 27 is described later.

The digital camera 28 photographs a subject. The speaker 29a outputs sound based on audio data. The microphone 29b picks up sound to generate audio data. In particular, when the user enters a command or information via so-called voice input, the microphone 29b generates audio data corresponding to user's voice.

The ROM 22 or the flash memory 23 stores, therein, one or more application programs (hereinafter, sometimes referred to as "application(s)" simply) for causing the multifunction device 3 to print out a document, for obtaining the document from the multifunction device 3, or for referring to the multifunction device 3 for a status thereof. The ROM 22 or the flash memory 23 also stores, therein, a program for wireless communication using the short-range communication unit 27. The programs are loaded into the RAM 21 and are executed by the CPU 20a.

Referring to FIG. 3, the multifunction device 3 is configured of a control unit 30, an Auto Document Feeder (ADF) 31, a scanner 32, a printer section 33, a paper supplying portion 34, an operating panel 35, a facsimile unit 36, a network interface 37, an auxiliary storage device 38, a short-range communication unit 39, and so on.

The control unit 30 is a main controller which controls an overall operation of the multifunction device 3. The control unit 30 includes a CPU 30a, a RAM 30b, a ROM 30c, and an image processing portion 30d.

The ROM 30c stores, therein, a program for controlling the auto document feeder 31, the scanner 32, the printer section 33, and so on to cause the multifunction device 3 to operate as a copier, a facsimile machine, an image reader, and so on. The ROM 30c also stores, therein, a program for controlling the short-range communication unit 27 to perform communication with the mobile terminal 3, and so on. The programs are loaded into the RAM 30b if necessary and are executed by the CPU 30a.

The image processing portion 30d applies processing associated with characteristics of a scan optical system to image data received from the scanner 32. Such processing includes shading correction and chromatic aberration correction. The image processing portion 30d also serves to compress/decompress the image data.

The auto document feeder 31 serves to convey one or more original documents placed in a paper feed tray to a paper discharge tray. During the conveyance, an image of the document 8 is optically read. The scanner 32 serves to optically read an image recorded on an original document placed on a platen glass. The auto document feeder 31 and the scanner 32 send, to the control unit 30, image data representing gradation values of each pixel of the image read.

When the short-range communication unit 39 receives a print job J2 sent by the mobile terminal 2, the printer section 33 prints an image based on the print job J2. In other words, the printer section 33 operates as an image formation section. The printer section 33 forms an image onto paper, for example, by electrophotography. The paper supplying portion 34 is provided with a paper cassette into which paper sheets are loaded. The paper supplying portion 34 takes a paper sheet out of the paper cassette to supply the sheet to the printer section 33.

The operating panel 35 includes a touch-sensitive panel display for displaying, for example, a screen for allowing the user to enter commands or information, and a key input portion having hard keys such as a start key and a stop key arranged therein. The operating panel 35 sends, to the control unit 30, a signal corresponding to user entry.

The facsimile unit 36 sends and receives image data with an external facsimile terminal in accordance with a protocol such as G3.

The network interface 37 is to perform communication through a communication line with a device such as a USB memory detachable to a personal computer, a smartphone, and the multifunction device 3. Examples of the communication line include a local area network line (LAN) and the Internet.

The auxiliary storage device 38 stores, therein, image data sent by the control unit 30 and a document transferred from an external device. Examples of the auxiliary storage device 38 include a hard disk drive and a Solid State Drive (SSD).

The short-range communication unit 39 is herein a module component for Bluetooth Low Energy. The short-range communication unit 39 performs communication with a device such as the mobile terminal 2. The short-range communication unit 39 is not limited thereto. As long as communication with the mobile terminal 2 is possible, the short-range communication unit 39 may be any device which performs communication meeting standards for another Bluetooth, or, any device which performs communication meeting the other standards.

The short-range communication unit 39 is configured to perform the cryptographic communication and the plaintext communication with the short-range communication unit 27 of the mobile terminal 2. For cryptographic communication with the short-range communication unit 27, the short-range communication unit 39 performs at least one of encryption and decryption. The configuration of the short-range communication unit 39 is described later.

The communication processing system 1 switches, between the cryptographic communication and the plaintext communication, wireless communication to be performed between the short-range communication unit 27 of the mobile terminal 2 and the short-range communication unit 39 of the multifunction device 3 depending on the content of data to be sent/received.

For example, in general, some documents probably include information to be concealed, such as personal information. For this reason, it is necessary to encrypt the documents for the purpose of reducing a risk of information leakage for the case where a third party intercepts the communication. Meanwhile, an electronic mail message and a facsimile image contain personal information of a destination, an e-mail address, or a home address. Thus, the communication processing system 1 performs cryptographic communication for sending/receiving a document, an e-mail message, or a facsimile image.

In the meantime, it is not preferable for a third party to intercept sending/receiving of, for example, a status of the multifunction device 3 or a command given to the multifunction device 3. However, even if this is the case, it has a low risk of leakage of, at least, personal information. In view of this, the communication processing system 1 performs plaintext communication for sending/receiving a status or a specific command. The plaintext communication is superior to the cryptographic communication in response.

The communication processing system 1 saves, from the short-range communication unit 39, encryption key information 40 described later while no cryptographic communication is performed between the multifunction device 3 and the mobile terminal 2. This enables the multifunction device 3 to perform cryptographic communication with more other ends of communication other than the mobile terminal 2.

The description goes on to a mechanism of the functions.

Figure 4A:
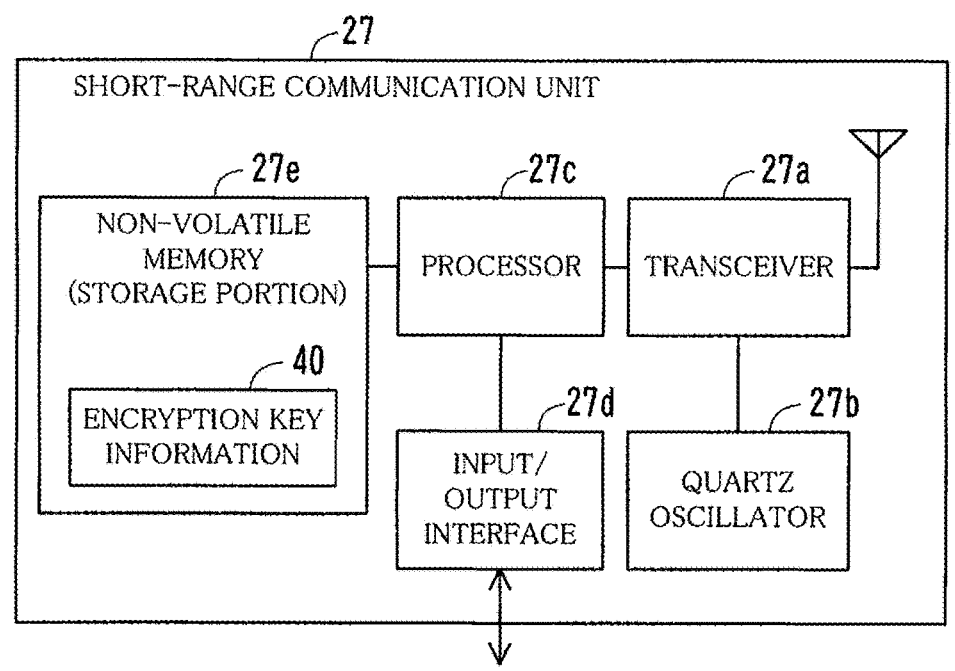
Figure 5:
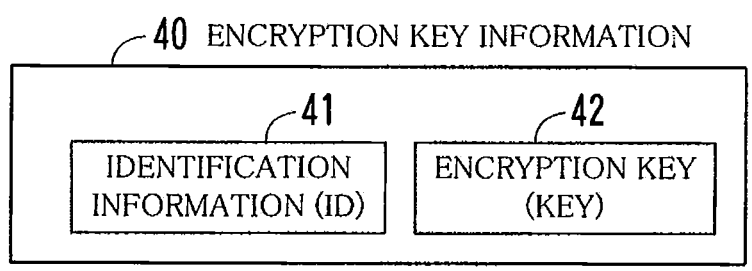
FIG. 5 is a diagram showing an example of the configuration of encryption key information.

FIGS. 4A and 4B show an example of the hardware configuration of the short-range communication unit 27 of the mobile terminal 2 and an example of the hardware configuration of the short-range communication unit 39 of the multifunction device 3, respectively. FIG. 5 shows an example of the configuration of the encryption key information 40.

Referring to FIG. 4A, the short-range communication unit 27 of the mobile terminal 2 includes a transceiver 27a, a quartz oscillator 27b, a processor 27c, an input/output interface 27d, and a storage portion 27e. The short-range communication unit 39 of the multifunction device 3 has the same configuration as that of the short-range communication unit 27. To be specific, as shown in FIG. 4B, the short-range communication unit 39 includes a transceiver 39a, a quartz oscillator 39b, a processor 39c, an input/output interface 39d, and a storage portion 39e. It is noted, however, that the short-range communication unit 27 and the short-range communication unit 39 may have different configurations from each other as long as the cryptographic communication and the plaintext communication can be performed therebetween.

The transceivers 27a and 39a send/receive radio waves, for example, in the bandwidth of 2.4 GHz. The quartz oscillators 27b and 39b generate clocks having a predetermined frequency to provide the clocks to the transceivers 27a and 39a, respectively.

The processors 27c and 39c serve to control overall operations of the short-range communication units 27 and 39, respectively, and to perform data processing including encryption and decryption. The input/output interface 27d is used for communication with the CPU 20. The input/output interface 39d is used for communication with the CPU 30a.

Each of the storage portions 27e and 39e is implemented by a non-volatile memory. Each of the storage portions 27e and 39e is a flash memory, for example. Each of the storage portions 27e and 39e stores, therein, the encryption key information 40 which is necessary for encryption and is provided for each of the other ends of communication. Each of the storage portions 27e and 39e is configured to store the encryption key information (pairing information) 40 up to a predetermined upper limit "N" of number of pieces. In this embodiment, it is assumed that the upper limit "N" for each of the storage portions 27e and 39e is "3". However, the mobile terminal 2 and the multifunction device 3 may differ from each other in upper limit "N". The upper limit "N" in each of the mobile terminal 2 and the multifunction device 3 is not limited to "3", and is any number equal to or larger than 1. The upper limit "N" may be "10" or "20", for example.

Referring to FIG. 5, the encryption key information 40 has at least a set of identification information (ID) 41 unique to the other end of communication and an encryption key 42 used for cryptographic communication with the other end of communication identified by the identification information 41. In other words, the encryption key information 40 is generated for each of the other ends of communication for pairing. The encryption key 42 is stored as a part of the encryption key information 40.

In the description provided below, as for the encryption key information 40, the identification information 41, and the encryption key 42, where it is necessary to make a distinction between those for the mobile terminal 2 and those for the multifunction device 3, the former and the latter may be differentiated as follows. The former for the mobile terminal 2 may be described by adding "A" to the reference numeral, such as encryption key information 40A, identification information 41A, and an encryption key 42A. The latter for the multifunction device 3 may be described by adding "M" to the reference numeral, such as encryption key information 40M, identification information 41M, and an encryption key 42M.

In this embodiment, the multifunction device 3 has a storage area 500 to which the encryption key information 40 stored in the storage portion 39e is temporarily saved outside the short-range communication unit 39. For example, a part of the RAM 30b is used as the storage area 500 (see FIG. 3). The storage area 500 is provided external to the short-range communication unit 39, for example, external to the BLE chip to store one or more pieces of the encryption key information 40. The storage area 500 may be provided in the auxiliary storage device 38 or another storage device. The storage area 500 may be a volatile or non-volatile memory.

For cryptographic communication with the short-range communication unit 27 of the mobile terminal 2, the short-range communication unit 39 of the multifunction device 3 performs at least one of encryption and decryption based on the encryption key 42A contained in the encryption key information 40A corresponding to the mobile terminal 2 stored in the storage portion 39e. After completion of the cryptographic communication with the short-range communication unit 27, the short-range communication unit 39 moves, to the storage area 500, the encryption key information 40A corresponding to the mobile terminal 2 stored in the storage portion 39e thereby to delete the encryption key information 40A from the storage portion 39e. Thereafter, for another cryptographic communication again with the short-range communication unit 27, the short-range communication unit 39 obtains, from the storage area 500, the encryption key information 40A corresponding to the mobile terminal 2 thereby to store the encryption key information 40A into the storage portion 39e.

The encryption key information 40A is moved in this way, so that the encryption key information 40A is deleted from the storage portion 39e and the encryption key information 40A is written into the storage area 500. At this time, instead of deleting the encryption key information 40A, a part thereof may be left in the storage portion 39e.

Figure 6:
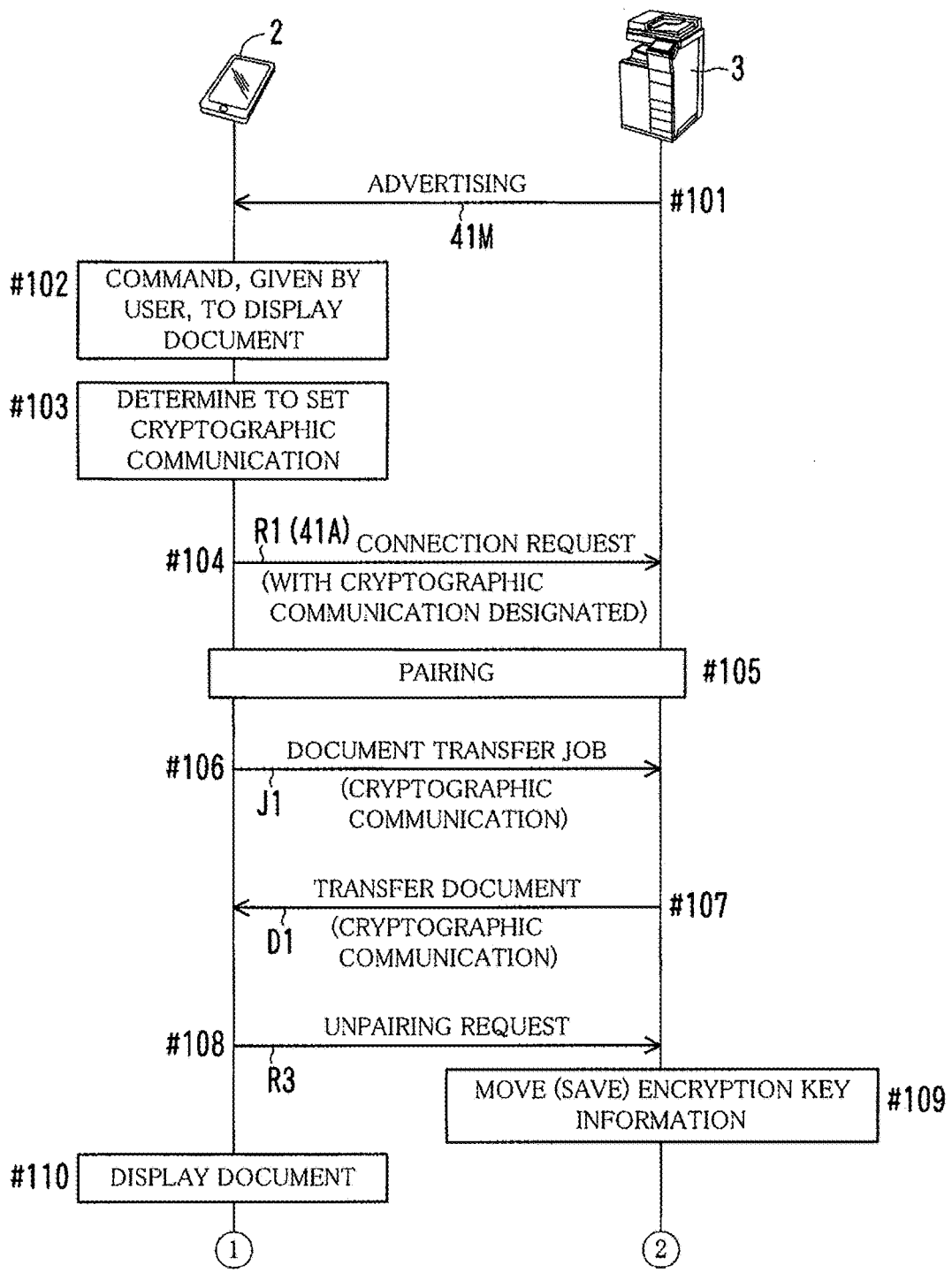
FIG. 6 is a sequence diagram depicting an example of the flow of processing for Case 1.
Figure 7:
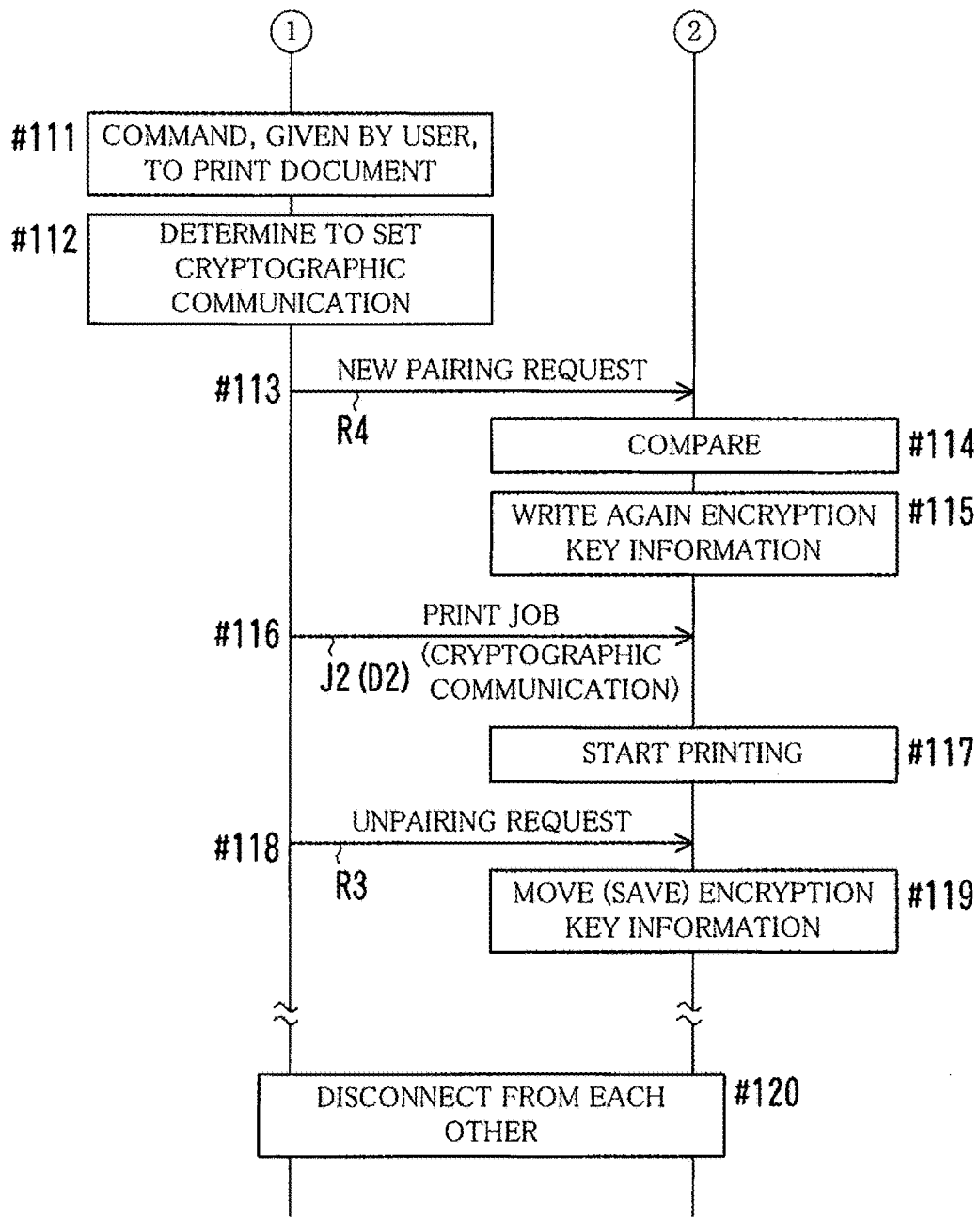
FIG. 7 is a sequence diagram depicting an example of the flow of processing for Case 1.

FIGS. 6 and 7 are sequence diagrams depicting an example of the flow of processing for Case 1. FIGS. 8(A)-8(E) are transition diagrams showing an example of the state of the storage portions 27e and 39e and the storage area 500 for Case 1.

Case 1 is a case where a user of the mobile terminal 2 causes the mobile terminal 2 to display a document stored in the multifunction device 3 and views the document, and thereafter, causes the multifunction device 3 to print out another document.

Referring to FIG. 6, the multifunction device 3 performs advertising for informing devices around the multifunction device 3 that the multifunction device 3 is present therearound (Step #101). To be specific, for example, the multifunction device 3 broadcasts advertising packets which can be received by devices complying with the standard for Bluetooth LE. The communication range is a space having a radius of, for example, 5 to 30 meters. The mobile terminal 2 receives the advertising packets so as to recognize the multifunction device 3 as a candidate for the other end of communication. The advertising packets include the identification information 41M on the multifunction device 3.

The user starts a browsing application (P1) to give a command to display a document D1 stored in the multifunction device 3 (Step #102). For displaying the document D1, the application (P1) starts processing for obtaining data on the document D1 from the multifunction device 3.

The mobile terminal 2 determines that communication for obtaining data on the document D1 with the multifunction device 3 is set at cryptographic communication where data is encrypted (Step #103). The mobile terminal 2 then sends, to the multifunction device 3, a connection request R1 for requesting connection with cryptographic communication designated (Step #104). The connection request R1 includes the identification information 41A on the requesting mobile terminal 2.

It is supposed that, in Step #104, the mobile terminal 2 and the multifunction device 3 do not share the encryption key 42A with each other. Stated differently, it is supposed that, in Step #104, the mobile terminal 2 and the multifunction device 3 are not paired with each other. Referring to FIG. 8(A), the storage portion 27e of the mobile terminal 2 does not store the encryption key information 40M corresponding to the multifunction device 3. The storage portion 39e of the multifunction device 3 stores encryption key information 40X corresponding to devices other than the mobile terminal 2. The storage portion 39e, however, does not store the encryption key information 40A corresponding to the mobile terminal 2. The storage area 500 is empty.

When the multifunction device 3 receives the connection request R1, the multifunction device 3 and the mobile terminal 2 perform pairing for sharing the encryption key 42A as shown in FIG. 8(B) (Step #105). To be specific, for example, the multifunction device 3 generates the encryption key 42A to send the same to the mobile terminal 2. The multifunction device 3 writes the identification information 41A and the encryption key 42A of the mobile terminal 2 to the storage portion 39e as the encryption key information 40A corresponding to the mobile terminal 2. The mobile terminal 2 writes the encryption key 42A received and the identification information 41M of the multifunction device 3 into the storage portion 27e as the encryption key information 40M corresponding to the multifunction device 3. Thereby, the encryption key 42A is shared by the multifunction device 3 and the mobile terminal 2, so that the multifunction device 3 and the mobile terminal 2 pair up so as to be ready to perform cryptographic communication for encryption and decryption based on the encryption key 42A.

After the multifunction device 3 and the mobile terminal 2 pair up, the mobile terminal 2 encrypts a document transfer job J1 to send the resultant to the multifunction device 3 (Step #106). The document transfer job J1 contains information for the multifunction device 3 to identify the document D1. Such information is, for example, a file name and a path to a storage location. The multifunction device 3 receives the document transfer job J1 to decrypt the same. The multifunction device 3 then executes the document transfer job J1. To be specific, the multifunction device 3 reads, from the storage location, the data on the document D1 designated in the document transfer job J1 to send the data to the mobile terminal 2 (Step #107).

When receiving the data on the document D1, i.e., finishing the cryptographic communication, the mobile terminal 2 sends an unpairing request R3 to the multifunction device 3 (Step #108). The document D1 is displayed based on the received data (Step #110).

When receiving the unpairing request R3, the multifunction device 3 moves the encryption key information 40A corresponding to the requesting mobile terminal 2 from the storage portion 39e to the storage area 500 as shown in FIG. 8(C) (Step #109). To be specific, the multifunction device 3 saves the encryption key information 40A to the storage area 500 to delete the encryption key information 40A from the storage portion 39e, so that a space becomes available in the storage portion 39e so that one piece of encryption key information 40 can be stored therein.

Referring to FIG. 7, the user of the mobile terminal 2 gives a printing application (P2) a command to use the multifunction device 3 to print a document D2 kept in the mobile terminal 2 (Step #111). The application (P2) responds to the command to start preparation for sending a print job J2 which contains data on the document D2 to be printed to the multifunction device 3.

The mobile terminal 2 determines that communication for sending the print job J2 to the multifunction device 3 is set at cryptographic communication (Step #112). However, in the multifunction device 3 which is the other end of the communication, the encryption key information 40A has been deleted from the storage portion 39e in accordance with the unpairing request R3. Stated differently, the multifunction device 3 is in a state of having cancelled the pair with the mobile terminal 2, which makes it impossible for the multifunction device 3 to decrypt the data sent from the mobile terminal 2. In view of this, the mobile terminal 2 sends a new pairing request R4 to the multifunction device 3 (Step #113).

Upon the receipt of the new pairing request R4, the multifunction device 3 compares between the identification information 41A of the mobile terminal 2 included in the new pairing request R4 and the identification information 41 of the encryption key information 40 stored in the storage area 500 (Step #114). As shown in FIG. 8(D), the multifunction device 3 writes the encryption key information 40A including the identification information 41A of the mobile terminal 2 from the storage area 500 to the storage portion 39e (Step #115). At this time, the encryption key information 40A may be written to any free space of the storage portion 39e. The encryption key information 40A may be written to an area to which the encryption key information 40A has been stored immediately before the encryption key information 40A is saved to the storage area 500. Alternatively, the encryption key information 40A may be written to another area. The encryption key information 40A of the storage area 500 may be left or may be deleted. In the example of FIG. 8(D), the encryption key information 40A remains left in the storage area 500.

The encryption key information 40A is thus written to the storage portion 39e, so that the mobile terminal 2 and the multifunction device 3 turn into a paired state again. In short, writing again (returning) the encryption key information 40A is processing corresponding to the pairing of the mobile terminal 2 with the multifunction device 3.

The mobile terminal 2 then encrypts the print job J2 to send the resultant to the multifunction device 3. The encryption is performed based on the encryption key 42A of the encryption key information 40M stored in the storage portion 27e. At this time, the encryption key 42A may be used as-is, or, may be converted into another key for use.

When receiving the print job J2, the multifunction device 3 decrypts the print job J2, and starts processing for printing the document D2 based on the data on the document D2 (Step #117). The decryption is performed based on the encryption key 42A of the encryption key information 40A stored in the storage portion 39e.

When the communication for sending the print job J2 is finished, the mobile terminal 2 sends again an unpairing request R3 to the multifunction device 3 (Step #118). The multifunction device 3 moves again the encryption key information 40A from the storage portion 39e to the storage area 500 in accordance with the unpairing request R3 (Step #119). The movement of the encryption key information 40A turns the storage portion 39e into a saved state similar to that of FIG. 8(C).

Thereafter, when the mobile terminal 2 leaves away from the communication range of the multifunction device 3, or, alternatively, when a period during which no communication is performed reaches a preset period of time, the mobile terminal 2 and the multifunction device 3 are disconnected from each other (Step #120). At the time of disconnection, or, at any time after the disconnection, the multifunction device 3 deletes the encryption key information 40A from the storage area 500 as shown in FIG. 8(E).

FIG. 9 is a sequence diagram depicting an example of the flow of processing for Case 2. FIGS. 10(A)-10(C) are diagrams showing an example of the state of the storage portions 27e and 39e and the storage area 500 for Case 2. Case 2 is a case where a user of the mobile terminal 2 confirms the status of the multifunction device 3.

Referring to FIG. 9, the multifunction device 3 performs advertising in a manner similar to that of Step #101 of FIG. 6 (Step #131).

The user of the mobile terminal 2 instructs an application (P3) for status check to display a status D3 of the multifunction device 3 (Step #132). In order to display the status D3, the application (P3) starts processing for obtaining data representing the status D3 from the multifunction device 3.

The mobile terminal 2 determines that communication for obtaining data on the status D3 with the multifunction device 3 is not set at cryptographic communication. Stated differently, the mobile terminal 2 determines that the communication with the multifunction device 3 is set at plaintext communication where data is not encrypted (Step #133). The mobile terminal 2 then sends, to the multifunction device 3, a connection request R2 for requesting connection with plaintext communication designated (Step #134). The connection request R2 includes the identification information 41A on the requesting mobile terminal 2.

It is assumed that, in Step #134, the storage portions 27e and 39e and the storage area 500 are in the state as shown in FIG. 10(A). To be specific, the storage portion 27e of the mobile terminal 2 does not store the encryption key information 40M corresponding to the multifunction device 3, and further, the storage portion 39e of the multifunction device 3 does not store the encryption key information 40A corresponding to the mobile terminal 2. Further, the storage area 500 is empty.

When the multifunction device 3 receives the connection request R2, predetermined data exchange is performed between the multifunction device 3 and the mobile terminal 2, so that connection therebetween is established (Step #135). At this time, generating and storing encryption key information 40 are not performed. Thus, as shown in FIG. 10(B), the states of the storage portions 27e and 39e and the storage area 500 remain unchanged from the states thereof before the connection is established.

When the connection is established, the mobile terminal 2 transmits a status information request R5 to the multifunction device 3 (Step #136). The status information request R5 is a command to request for transfer of data representing the status D3 of items designated by the user. The plaintext communication is used for the transmission of the status information request R5.

In response to the status information request R5 received, the multifunction device 3 sends, to the mobile terminal 2, updated data D3 indicating information on the requested status D3 as status information (Step #137). The plaintext communication is also used for sending the updated data D3.

The mobile terminal 2 displays the status D3 of the multifunction device 3 based on the updated data D3 sent from the multifunction device 3 (Step #138). After that, the mobile terminal 2 and the multifunction device 3 are disconnected from each other (Step #139).

As shown in FIGS. 10(A), 10(B), and 10(C), in the case where only the plaintext communication is performed and no cryptographic communication is performed, the content stored in the storage portions 27e and 39e is not changed. The plaintext communication does not need the processing for making a pair. To be more specific, the plaintext communication does not need the processing for generating an encryption key 42 and storing encryption key information 40 into the storage portions 27e and 39e. Thus, a response for communication connection to user's instructions is quicker in the plaintext communication than in the cryptographic communication.

Figure 11:
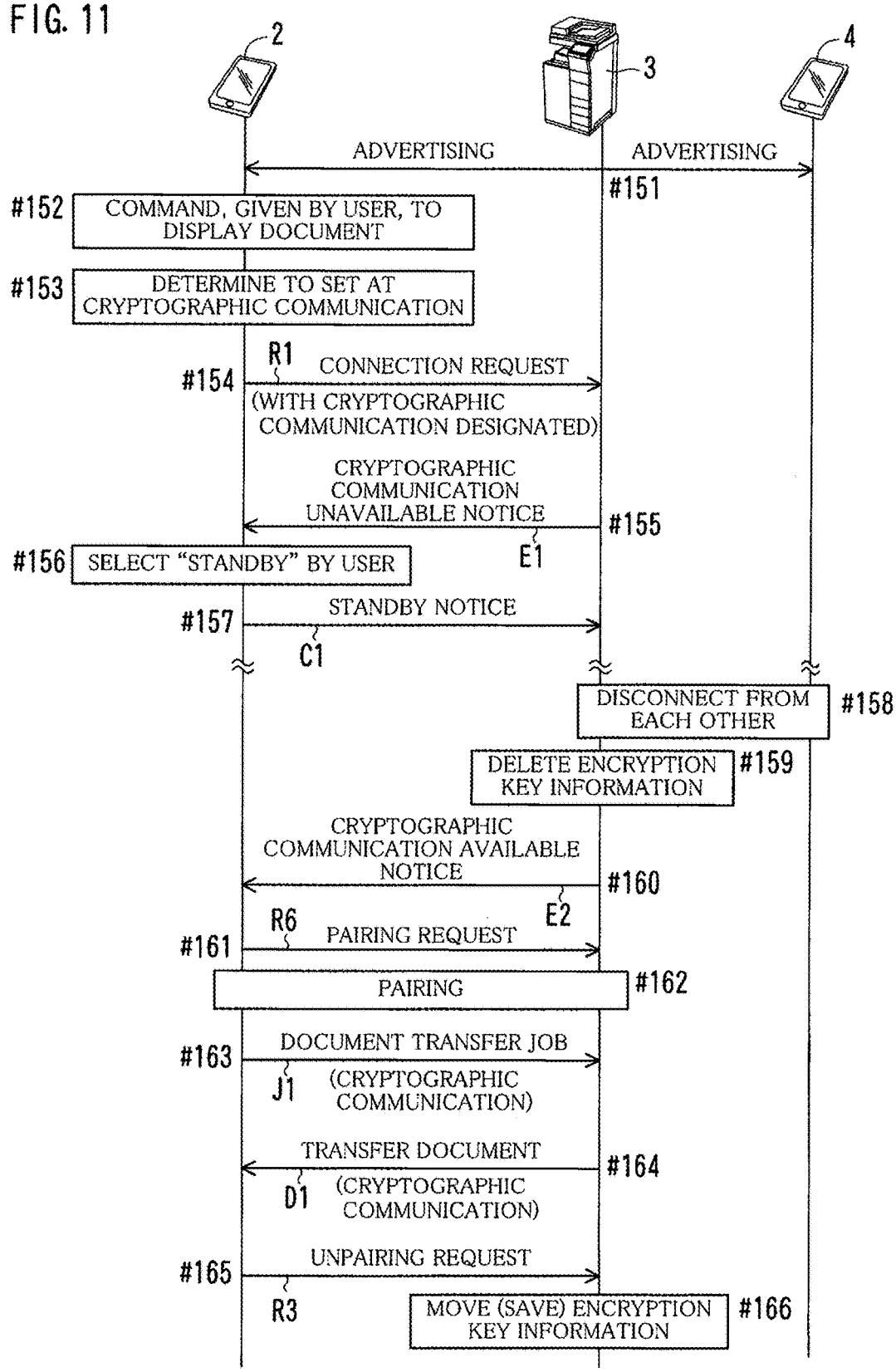
FIG. 11 is a sequence diagram depicting a first example of the flow of processing for Case 3.
Figure 12:
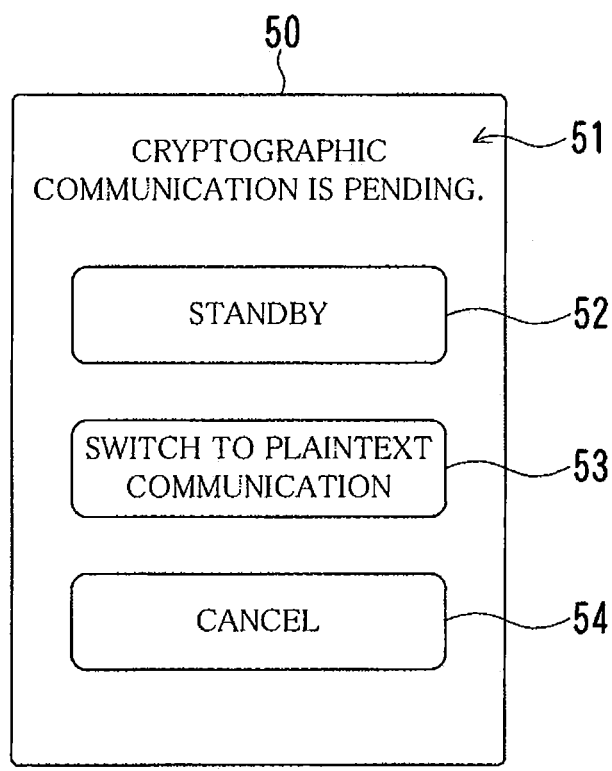
FIG. 12 is a diagram showing an example of a screen displayed in a mobile terminal for Case 3.

FIG. 11 is a sequence diagram depicting a first example of the flow of processing for Case 3. FIG. 12 shows an example of a screen 50 displayed in the mobile terminal 2 for Case 3. FIGS. 13(A)-13(D) are transition diagrams showing an example of the state of the storage portions 27e and 39e and the storage area 500 for Case 3.

Case 3 is a case where, when the mobile terminal 2 attempts to perform cryptographic communication with the multifunction device 3, the multifunction device 3 is in a state of being incapable of performing the cryptographic communication with the mobile terminal 2.

Where the multifunction device 3 is paired with each of three devices, which is the same number as the upper limit "N" described above, to share the encryption key 42, other devices not paired with the multifunction device 3 cannot perform cryptographic communication with the multifunction device 3 until the storage portion 39e of the multifunction device 3 has an available space.

Referring to FIG. 11, the processing from Step #151 through Step #154 is the same as the processing in the example of FIG. 6. To be specific, the multifunction device 3 performs advertising (Step #151), and the user of the mobile terminal 2 gives a command to display a document D1 (Step #152). The mobile terminal 2 determines that communication for obtaining data on the document D1 is set at cryptographic communication (Step #153), and sends a connection request R1 to the multifunction device 3 (Step #154).

The example of FIG. 11 and the example of FIG. 6 are different from each other in the following respect. According to the example of FIG. 6, at the transmission step of the connection request R1, the mobile terminal 2 and the multifunction device 3 can be paired with each other. In contrast, according to the example of FIG. 11, at the transmission step of the connection request R1, the mobile terminal 2 and the multifunction device 3 cannot be paired with each other.

The pairing in the example of FIG. 11 is impossible because of the following reason. To be specific, as shown in FIG. 13(A), the storage portion 39e of the multifunction device 3 stores three pieces of encryption key information 40X, 40Y, and 40Z, which is the same number as the upper limit "N". Stated differently, each of three devices including a device 4 is paired with the multifunction device 3. None of the encryption key information 40X, 40Y, and 40Z is the encryption key information 40A corresponding to the mobile terminal 2. Storing the encryption key information 40A corresponding to the mobile terminal 2 into the storage portion 39e is impossible because it would exceed the upper limit "N". Thus, the mobile terminal 2 and the multifunction device 3 cannot pair up to share the encryption key 42A to perform cryptographic communication.

In some cases, all or a part of devices corresponding to the encryption key information 40X, 40Y, and 40Z have a function to cancel the paired state after performing cryptographic communication, as with the mobile terminal 2. In other cases, none of such devices have such a function.

The multifunction device 3 sends, to the requesting mobile terminal 2 from which the connection request R1 is sent, a cryptographic communication unavailable notice E1 informing that the multifunction device 3 is temporarily unable to perform the cryptographic communication (Step #155).

Upon receiving the cryptographic communication unavailable notice E1, the mobile terminal 2 displays the screen 50 shown in FIG. 12 on the touch-sensitive panel display 24. The screen 50 has a message 51 informing the user that the multifunction device 3 is temporarily unable to perform the cryptographic communication. The screen 50 also has three buttons 52, 53, and 54 by way of which the user enters commands.

The user is allowed to select, as a command to be entered into the mobile terminal 2, any one of three commands: "standby"; "switch to plaintext communication"; and "cancel". The command "standby" is a command to instruct the mobile terminal 2 to wait for cryptographic communication to become available and then to perform cryptographic communication. The command "switch to plaintext communication" is a command to instruct the mobile terminal 2 to perform communication by changing cryptographic communication to plaintext communication. The command "cancel" is a command to instruct the mobile terminal 2 to stop the communication.

The user touches the button 52, 53, or 54 to enter the command "standby", "switch to plaintext communication", or "cancel", respectively.

As described above, the options for commands include "switch to plaintext communication". This enables the user to cause the mobile terminal 2 to perform communication promptly without waiting for the cryptographic communication to become available. The user preferably selects "switch to plaintext communication" in the case where he/she determines that no information leaks even if the content of the data to be sent/received is not encrypted.

In addition to the message 51, a message for prompting the user to enter a command may be provided in the screen 50. Instead of the screen 50 displayed, or, along with the screen 50 displayed, other methods such as audio output may be used to inform the user that the cryptographic communication is not temporarily available. Alternatively, command entry by audio input may be accepted.

Referring to the example of FIG. 11, the user selects "standby" (Step #156). In response to the button 52 selected by the user, the mobile terminal 2 sends a standby notice C1 to the multifunction device 3 (Step #157). When receiving the standby notice C1, the multifunction device 3 judges that the mobile terminal 2 waits for the cryptographic communication to become available.

Thereafter, when the device 4 and the multifunction device 3 are disconnected from each other for example (Step #158), the multifunction device 3 deletes the encryption key information 40X corresponding to the device 4 from the storage portion 39e as shown in FIG. 13(B) (Step #159). This makes a space for one piece of the encryption key information 40 available in the storage portion 39e, which enables new pairing.

Where the device 4 has a function to output an unpairing request R3 as with the mobile terminal 2, the multifunction device 3 receives the unpairing request R3 from the device 4, and saves the encryption key information 40X corresponding to the device 4 to the storage area 500. This also creates a space in the storage portion 39e, so that new pairing is possible.

The multifunction device 3 sends, to the mobile terminal 2 which has been waiting for the cryptographic communication to become available, a cryptographic communication available notice E2 for informing that the multifunction device 3 is ready to perform cryptographic communication (Step #160).

The mobile terminal 2 receives the cryptographic communication available notice E2, and in return, sends a pairing request R6 to the multifunction device 3 (Step #161).

In response to the pairing request R6 received by the multifunction device 3, the multifunction device 3 and the mobile terminal 2 pair up to share the encryption key 42A as shown in FIG. 13(C) (Step #162). The details of the pairing are the same as those of the pairing in Step #105 of FIG. 6.

Thereafter, processing similar to that of Step #106 through Step #110 of FIG. 6 is performed. To be specific, the mobile terminal 2 sends a document transfer job J1 to the multifunction device 3 (Step #163), and the multifunction device 3 sends data D1 on the designated document to the mobile terminal 2 (Step #164). The mobile terminal 2 sends an unpairing request R3 to the multifunction device 3 (Step #165). The multifunction device 3 moves the encryption key information 40A from the storage portion 39e to the storage area 500 as shown in FIG. 13(D) (Step #166).

Figure 14:
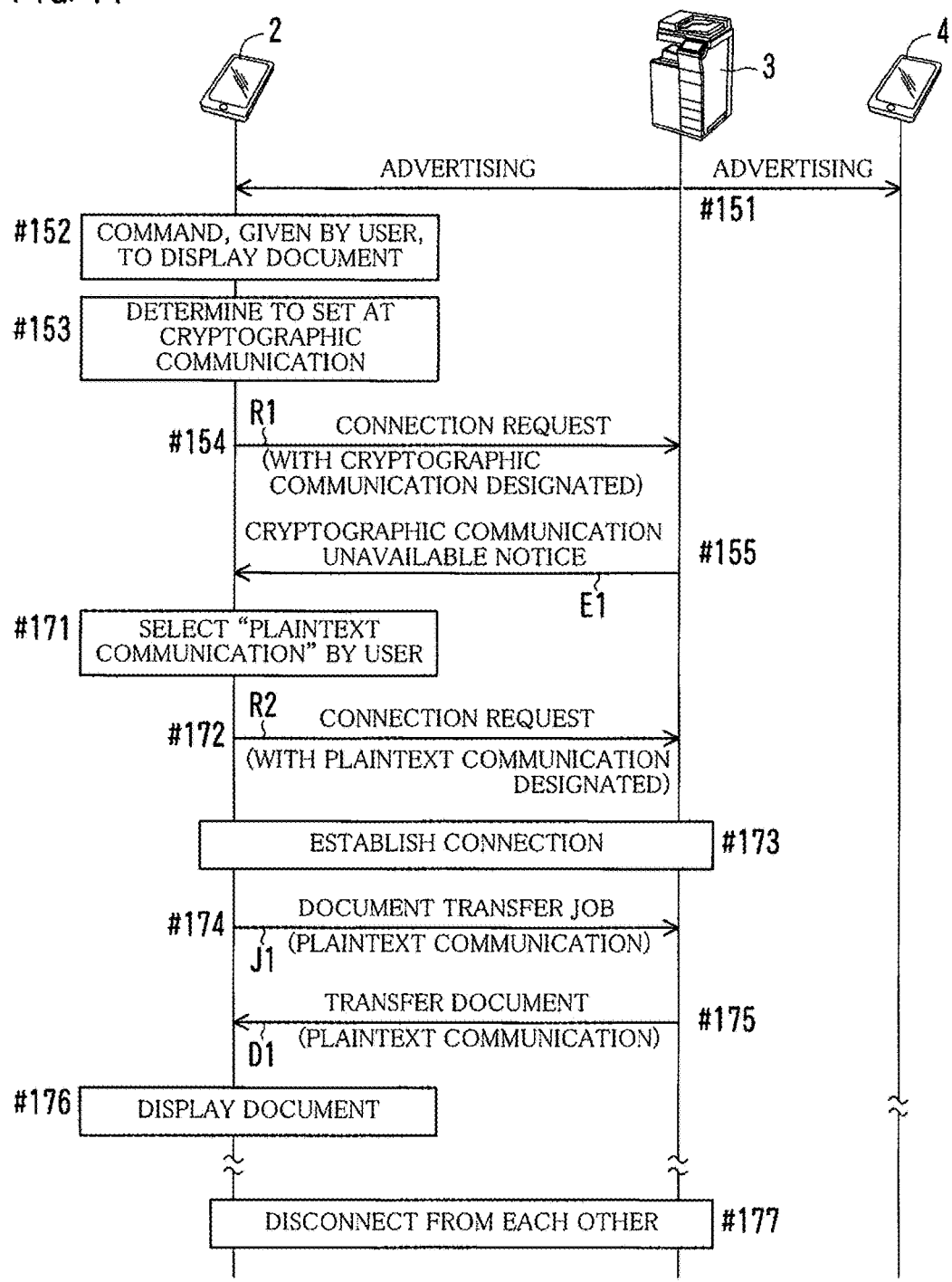
FIG. 14 is a sequence diagram depicting a second example of the flow of processing for Case 3.

FIG. 14 is a sequence diagram depicting a second example of the flow of processing for Case 3. In the second example, the processing from Step #151 through Step #155 is performed as with the example of FIG. 11, and the screen 50 is displayed. The user selects, in this case, the command "switch to plaintext communication" (Step #171).

In response to the button 53 touched by the user, the mobile terminal 2 sends, to the multifunction device 3, a connection request R2 for requesting connection with plaintext communication designated (Step #172). When the multifunction device 3 receives the connection request R2, predetermined data exchange is performed between the multifunction device 3 and the mobile terminal 2, so that connection therebetween is established (Step #173).

The mobile terminal 2 sends a document transfer job J1 to the multifunction device 3 without encrypting the same (Step #174). The multifunction device 3 reads data on a document D1 designated in the document transfer job J1 out of the storage location, and sends to the mobile terminal 2 the data without being encrypted (Step #175). The mobile terminal 2 receives the data on the document D1, and displays the document D1 based on the received data in the touch-sensitive panel display 24 (Step #176). Thereafter, the mobile terminal 2 and the multifunction device 3 are disconnected from each other (Step #177).

Figure 15:
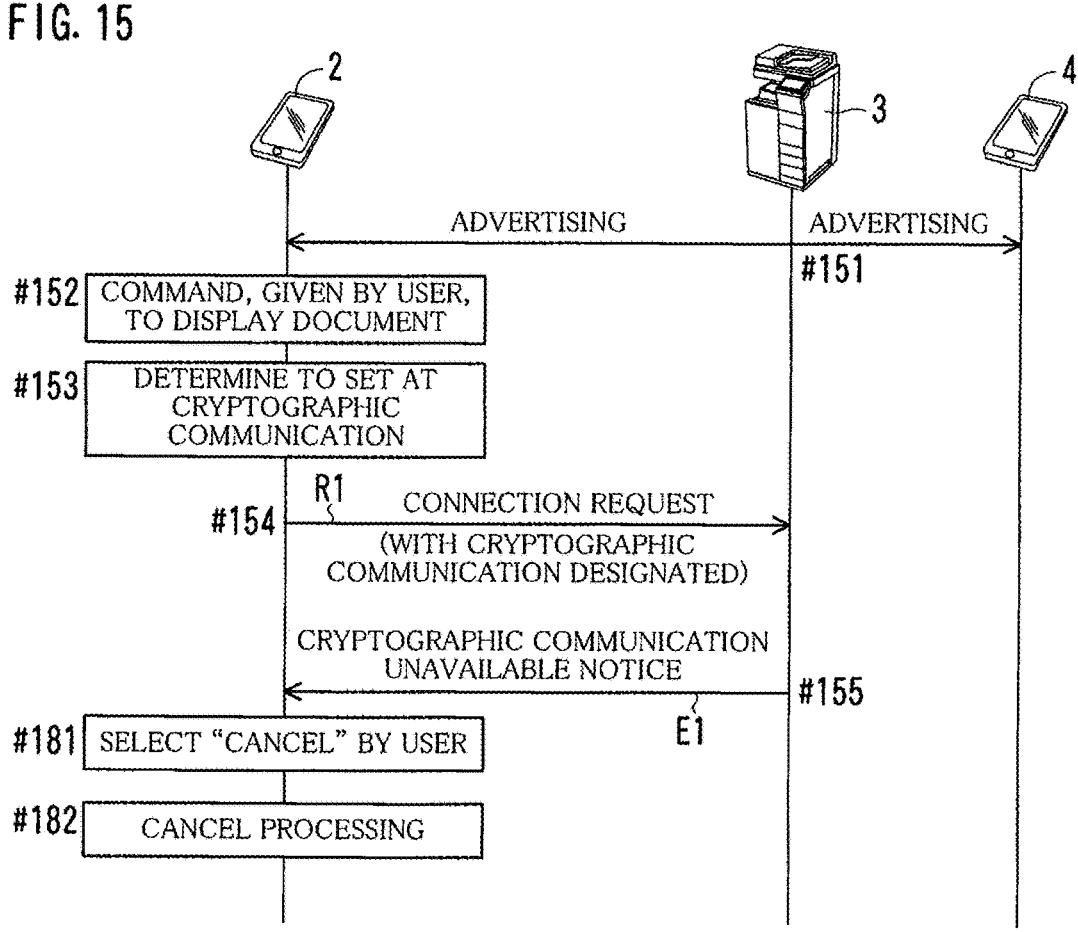
FIG. 15 is a sequence diagram depicting a third example of the flow of processing for Case 3.

FIG. 15 is a sequence diagram depicting a third example of the flow of processing for Case 3. In the third example, the processing from Step #151 through Step #155 is performed as with the examples of FIGS. 11 and 14, and the screen 50 is displayed. In the third example, the user selects the command "cancel" (Step #181).

In response to the button 54 touched by the user, the mobile terminal 2 performs cancel processing (Step #182) for finishing the application (P1) which has been started to browse the document D1 by the user.

Figure 16:
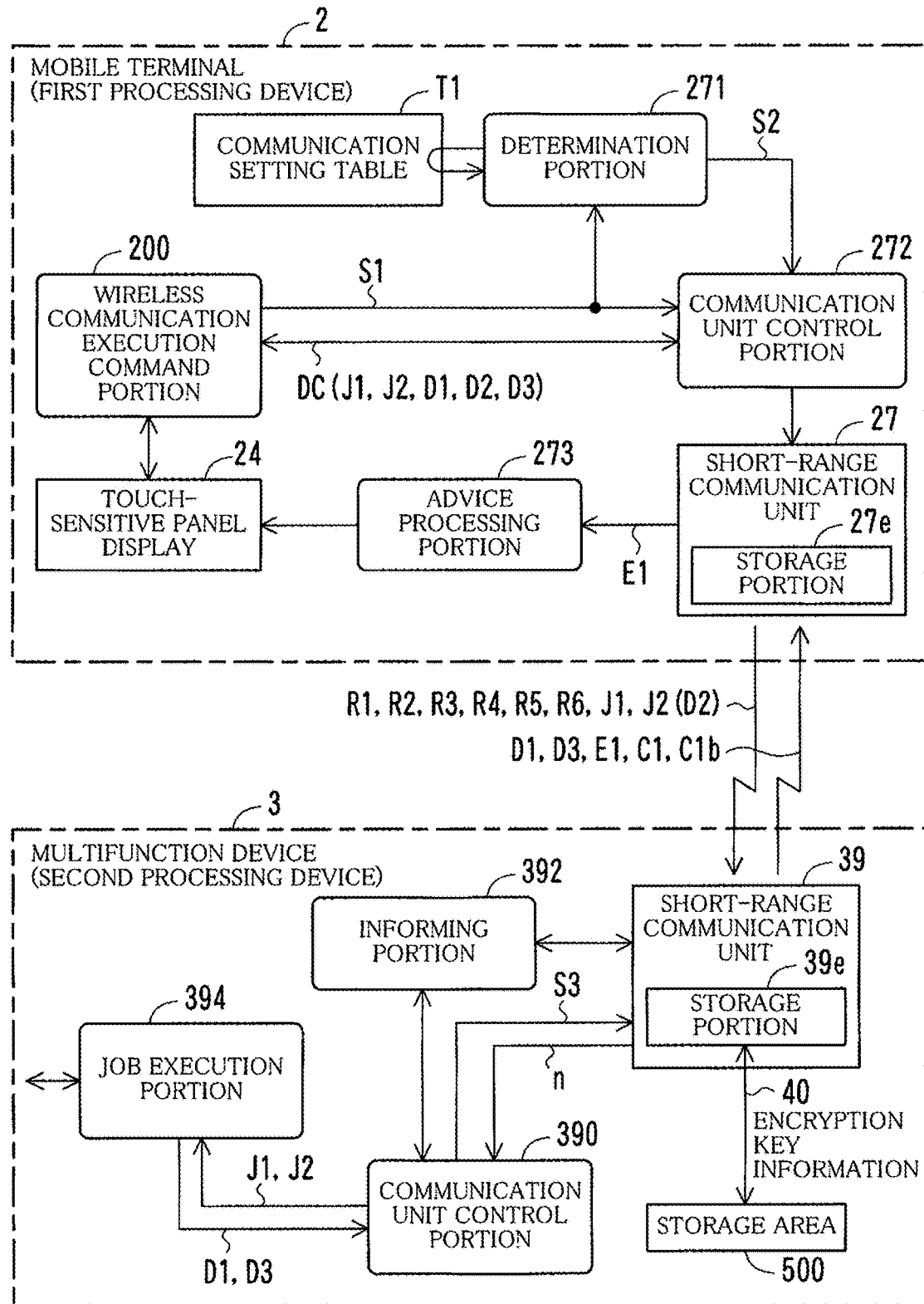
FIG. 16 is a diagram showing an example of the functional configuration of a main part of a mobile terminal and the functional configuration of a main part of a multifunction device.

FIG. 16 is a diagram showing an example of the functional configuration of the main part of the mobile terminal 2 and the functional configuration of the main part of the multifunction device 3.

The mobile terminal 2 is configured of a determination portion 271, a communication unit control portion 272, an advice processing portion 273, and so on. The functions of the portions are implemented by the foregoing hardware configuration, and by executing the program for wireless communication by the CPU 20.

The mobile terminal 2 is also configured of a wireless communication execution command portion 200. The function of the wireless communication execution command portion 200 is implemented by the foregoing hardware configuration, and by executing the foregoing one or more applications (P1, P2, P3) by the CPU 20.

The wireless communication execution command portion 200 produces communication processing of using the short-range communication unit 27 to send/receive data DC between the mobile terminal 2 and the multifunction device 3 in accordance with user operation performed by using the touch-sensitive panel display 24 or the operation buttons 25. The wireless communication execution command portion 200 sends a communication execution command S1 requesting execution of wireless communication to the communication unit control portion 272.

The determination portion 271 determines whether or not the communication to be used by the short-range communication unit 27 is set at cryptographic communication depending on the content of the data DC to be sent/received in the communication. The details thereof are provided below.

Where the communication processing is to send, as the data DC, jobs J1 and J2 to be executed by the multifunction device 3, or, where the communication processing is to send or receive, as the data DC, information to be concealed, the determination portion 271 determines that the communication is set at cryptographic communication. In contrast, where the communication processing is to receive, as the data DC, information indicating the status D3 of the multifunction device 3, the determination portion 271 determines that the communication is not set at cryptographic communication.

For making such determinations, the determination portion 271 detects, for example, attributes (types) of communication as the content of the data DC to be sent/received based on the communication execution command S1 inputted from the wireless communication execution command portion 200 to the communication unit control portion 272. The communication execution command S1 includes information on attributes of communication, e.g., an identifier of data form of the data DC to be sent/received, and an identifier of software for providing or obtaining the data DC. The determination portion 271 refers to a communication setting table T1 in which communication modes (cryptographic communication/plaintext communication) are assigned in advance for each attribute of communication. Where cryptographic communication is assigned to the detected attributes of communication, the determination portion 271 determines that the communication is set at cryptographic communication. Where plaintext communication is assigned to the detected attributes of communication, the determination portion 271 determines that the communication is not set at cryptographic communication. The determination portion 271 informs the communication unit control portion 272 of a determination result S2.

Another arrangement is also possible. To be specific, attributes of communication processing are assigned only to plaintext communication in the communication setting table T1. Where the detected attributes of communication processing are not assigned in the communication setting table T1, the determination portion 271 determines that the communication is set at cryptographic communication. Where the detected attributes of communication are assigned in the communication setting table T1, the determination portion 271 determines that the communication is not set at cryptographic communication. Yet another arrangement is also possible. To be specific, attributes of communication processing are assigned only to cryptographic communication in the communication setting table T1. Only where the detected attributes of communication are assigned in the communication setting table T1, the determination portion 271 determines that the communication is set at cryptographic communication.

The determination is not limited to be made based on an identifier of data form or an identifier of software. Another arrangement is also possible. To be specific, the data DC is analyzed so as to check whether or not the data DC includes information to be concealed such as personal information registered in advance. If the data DC includes such information, then the determination portion 271 determines that the communication is set at cryptographic communication. If the data DC includes no such information, then the determination portion 271 determines that the communication is not set at cryptographic communication.

The identifier of data form, the identifier of software for providing or obtaining the data DC, and the presence/absence of registered information to be concealed are examples of the content of the data DC.

The communication unit control portion 272 causes the short-range communication unit 27 to perform communication in accordance with the communication execution command S1 sent by the wireless communication execution command portion 200. The communication unit control portion 272 relays the data DC sent/received between the wireless communication execution command portion 200 and the short-range communication unit 27.

Further, the communication unit control portion 272 controls the short-range communication unit 27 depending on the determination result S2 sent by the determination portion 271. To be specific, where the determination portion 271 determines that cryptographic communication is to be performed, the communication unit control portion 272 controls the short-range communication unit 27 to perform cryptographic communication. Where the determination portion 271 determines that cryptographic communication is not to be performed, the communication unit control portion 272 controls the short-range communication unit 27 to perform plaintext communication.

When being informed through the cryptographic communication unavailable notice E1 that cryptographic communication is not available in the multifunction device 3, the advice processing portion 273 performs advice processing for informing the user of the mobile terminal 2 that cryptographic communication is not available in the multifunction device 3. As described earlier, advice processing is performed by, for example, displaying a screen in the touch-sensitive panel display 24 to prompt the user to make a decision. By virtue of the advice processing portion 273, the mobile terminal 2 enables the user to select whether or not to switch from cryptographic communication to plaintext communication when an informing portion 392 of the multifunction device 3, described later, informs the mobile terminal 2 that the cryptographic communication is not available in the multifunction device 3.

The multifunction device 3 is configured of a communication unit control portion 390, the informing portion 392, a job execution portion 394, and so on. The functions of the portions are implemented by the foregoing hardware configuration. The functions of the portions are implemented by the foregoing hardware configuration, and by executing the foregoing control programs by the CPU 30a.

The communication unit control portion 390 relays data to be sent/received between the short-range communication unit 39 and the job execution portion 394. The data to be received in the job execution portion 394 includes different jobs (J1 and J2) which are given from the mobile terminal 2 to the multifunction device 3. The data to be sent from the job execution portion 394 includes data D1 on the document and data D3 showing a status.

Further, the communication unit control portion 390 monitors, via the processor 39c of the short-range communication unit 39, how the wireless communication goes. If necessary, the communication unit control portion 390 gives, to the processor 39c, an execution command S3 to move (save) or write again the encryption key information 40.

In response to the execution command S3, in performing plaintext communication with the short-range communication unit 27, the short-range communication unit 39 moves encryption key information 40A, stored in the storage portion 39e, corresponding to the mobile terminal 2 to the storage area 500, so that the encryption key information 40A is deleted from the storage portion 39e. In performing cryptographic communication, the short-range communication unit 39 obtains the encryption key information 40A from the storage area 500 to store the encryption key information 40A into the storage portion 39e.

Where the encryption key information 40A cannot be stored into the storage portion 39e in spite of a request for cryptographic communication made by the mobile terminal 2, the informing portion 392 uses the short-range communication unit 39 to inform the mobile terminal 2 that the cryptographic communication is not available. To be specific, the informing portion 392 instructs the short-range communication unit 39 to send a cryptographic communication unavailable notice E1. For example, the informing portion 392 obtains, from the processor 39c of the short-range communication unit 39, the number "n" which is the number of pieces of encryption key information 40 stored in the storage portion 39e through the communication unit control portion 390 or without the same. Then, the case where the number "n" is equal to the upper limit "N" is detected as a case where the encryption key 40A cannot be stored.

The description goes on to the processing performed by the communication processing system 1 with reference to flowcharts.

Figure 17:
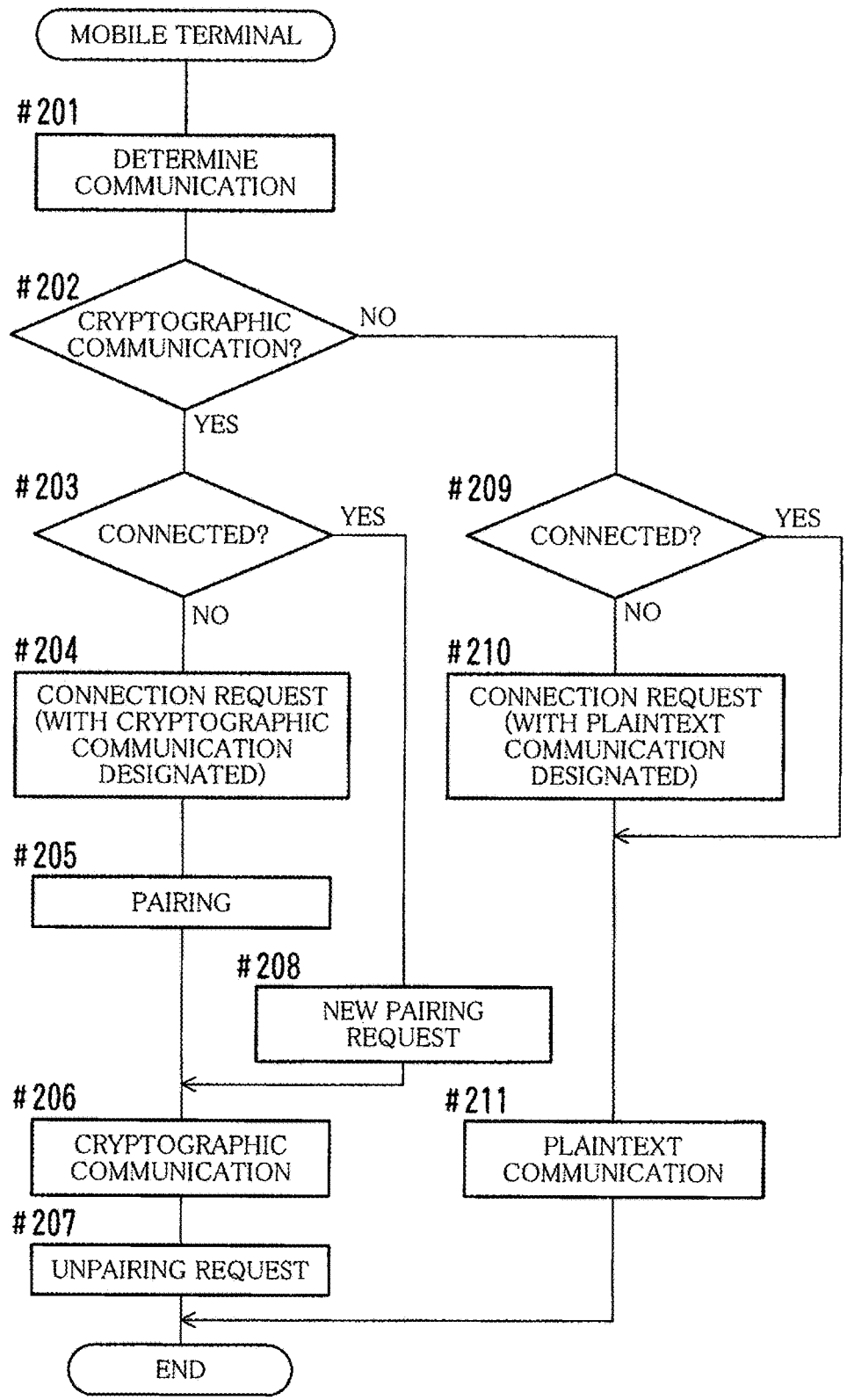
FIG. 17 is a flowchart depicting an example of the flow of processing in a mobile terminal.
Figure 18:
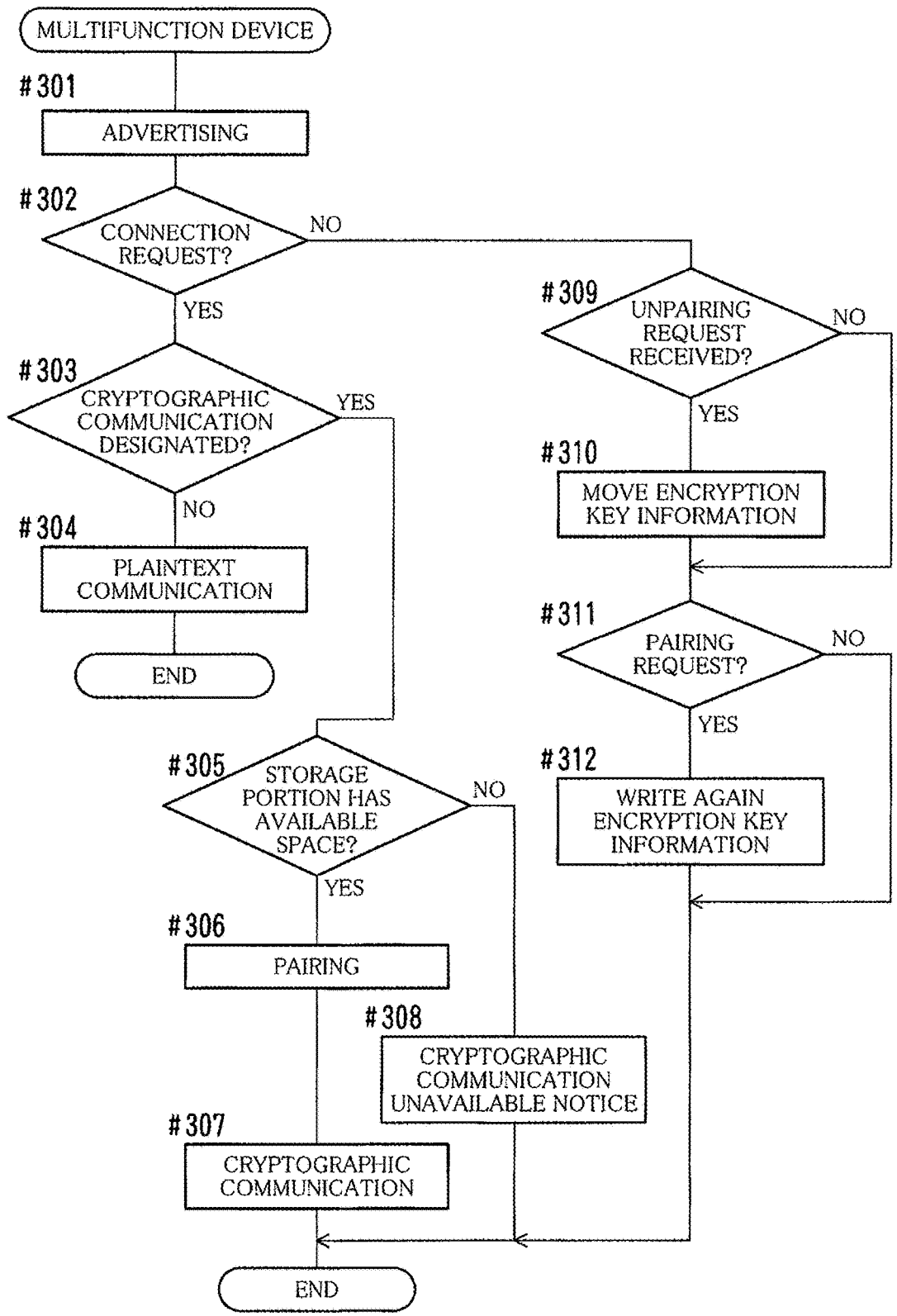
FIG. 18 is a flowchart depicting an example of the flow of processing in a multifunction device.

FIG. 17 is a flowchart depicting an example of the flow of processing in the mobile terminal 2. FIG. 18 is a flowchart depicting an example of the flow of processing in the multifunction device 3.

Referring to FIG. 17, the mobile terminal 2 determines whether or not communication designated by a user is processed as cryptographic communication (Step #201). Where the result of determination is "to process as cryptographic communication" (YES in Step #202), the mobile terminal 2 checks whether or not the mobile terminal 2 is in a connected state where connection with the multifunction device 3 is established (Step #203).

Where the mobile terminal 2 is not in the connected state (NO in Step #203), the mobile terminal 2 asks the multifunction device 3 to make connection with the mobile terminal 2 with cryptographic communication designated (Step #204). In short, the mobile terminal 2 sends a connection request R1 to the multifunction device 3.

The mobile terminal 2 makes a pair with the multifunction device 3 (Step #205). The mobile terminal 2 uses the encryption key 42A shared thereby to perform cryptographic communication with the multifunction device 3 (Step #206). When the cryptographic communication is finished, the mobile terminal 2 sends an unpairing request R3 to the multifunction device 3 (Step #207).

Where the mobile terminal 2 is already in the connected state (YES in Step #203), the mobile terminal 2 sends a new pairing request R4 to the multifunction device (Step #208). The mobile terminal 2 then performs the cryptographic communication (Step #206) and sends the unpairing request R3 (Step #207).

In contrast, where the result of determination is "not to process as cryptographic communication" (NO in Step #202), the processing goes to Step #209 and the mobile terminal 2 checks whether or not the mobile terminal 2 is in the connected state.

Where the mobile terminal 2 is not in the connected state (NO in Step #209), the mobile terminal 2 asks the multifunction device 3 to make connection with the mobile terminal 2 with plaintext communication designated (Step #210). In short, the mobile terminal 2 sends a connection request R2. The mobile terminal 2 then performs the plaintext communication with the multifunction device 3 (Step #211).

Where the mobile terminal 2 is in the connected state (YES in Step #209), the connection request (Step #210) is bypassed, and the mobile terminal 2 performs the plaintext communication (Step #211).

Referring to FIG. 18, the multifunction device 3 performs advertising (Step #301), and checks whether or not to have a connection request from the mobile terminal 2 (Step #302).

Where a connection request is found (YES in Step #302), the multifunction device 3 checks whether or not the request designates cryptographic communication (Step #303).

Where the cryptographic communication is not designated in the request (NO in Step #303), the multifunction device 3 performs plaintext communication with the mobile terminal 2 (Step #304).

In contrast, where the cryptographic communication is designated in the request (YES in Step #303), the multifunction device 3 checks whether or not the storage portion 39e has an available space for a new piece of encryption key information 40 to be stored (Step #305).

Where the storage portion 39e has such an available space (YES in Step #305), the multifunction device 3 makes a pair with the mobile terminal 2 (Step #306) to perform cryptographic communication with the mobile terminal 2 (Step #307).

In contrast, where the storage portion 39e does not have such an available space (NO in Step #305), the multifunction device 3 sends a cryptographic communication unavailable notice E1 to the mobile terminal 2 (Step #308).

Where receiving an unpairing request R3 from the mobile terminal 2 (NO in Step #302 and YES in Step #309), the multifunction device 3 moves the encryption key information 40A from the storage portion 39e to the storage area 500

(Step #310). In short, the multifunction device 3 saves the encryption key information 40A.

When receiving a pairing request R6 from the mobile terminal 2 (NO in Step #302, NO in Step #309, and YES in Step #311), the multifunction device 3 reads the encryption key information 40A out of the storage area 500, and stores the encryption key information 40A into the storage portion 39e (Step #312). In short, the multifunction device 3 writes again (returns) the encryption key information 40A.

According to the foregoing embodiment, the encryption key information 40A is saved to the storage area 500 after cryptographic communication is performed, so that the storage portion 39e has an available space. Thus, another device can make a new pair with the multifunction device 3. Stated differently, it is possible to reduce occurrence of a situation in which the multifunction device 3 and another device cannot perform cryptographic communication due to the limit to the number of pieces of encryption key information 40 for encryption which can be stored multifunction device 3.

According to the embodiment, even in the situation where the number of pieces of encryption key information 40 to be stored for encryption reaches the upper limit "N", plaintext communication can be performed. To be specific, the following situation can be prevented from occurring: "not only sending/receiving data which needs to be encrypted but also sending/receiving data which does not need to be encrypted cannot be performed due to the limit to the number of piece of information to be stored for encryption".

When cryptographic communication is completed, the encryption key information 40A is saved to the storage area 500. Thus, plaintext communication can be started earlier as compared with the case where the encryption key information 40A is saved after the occurrence of communication processing for the plaintext communication. Thereby, where the user of the mobile terminal 2 checks the status D3 of the multifunction device 3, or where the user of the mobile terminal 2 stops printing started by the multifunction device 3, responsiveness to a command given by the user can be improved.

In the foregoing embodiment, the short-range communication unit 39 moves (saves) the encryption key information 40A from the storage portion 39e to the storage area 500 and writes again the encryption key information 40A from the storage area 500 to the storage portion 39e in accordance with a command from the communication unit control portion 390. The arrangement is not limited thereto. The short-range communication unit 39 may save and write again the encryption key information 40A based on determination made by the short-range communication unit 39 itself not based on a command given externally. To be specific, a function to determine whether or not to save and write again the encryption key information 40A can be implemented by executing a program for determination by the processor 39c, for example.

In the foregoing embodiment, in response to the completion of cryptographic communication, the mobile terminal 2 sends an unpairing request R3, and the multifunction device 3 receives the request and saves the encryption key information 40A. The arrangement is not limited thereto. The encryption key information 40A remains stored in the storage portion 39e even after the completion of cryptographic communication. The multifunction device 3 may write again the encryption key information 40A when the mobile terminal 2 determines that new communication is not set at cryptographic communication.

In such an arrangement, when the mobile terminal 2 and the multifunction device 3 perform cryptographic communication therebetween, and then, are disconnected from each other without performing plaintext communication, even after the disconnection, the encryption key information 40A corresponding to the mobile terminal 2 is stored in the storage portion 39e of the multifunction device 3. Thus, when the mobile terminal 2 and the multifunction device 3 establish a connection again therebetween to perform communication processing, as long as the communication is set at cryptographic communication, the cryptographic communication can be started without processing for making a pair.

According to the foregoing embodiment, whether or not to switch communication from cryptographic communication to plaintext communication can be selected at a time when it is informed, by the multifunction device 3, that the cryptographic communication is not available. Thus, the user of the mobile terminal 2 can instruct execution of communication by selecting "switch to plaintext communication" without waiting for the cryptographic communication to become available.

The first processing device of the communication processing system 1 is not limited to the mobile terminal 2. The second processing device of the communication processing system 1 is not limited to the multifunction device 3. Any number of plural devices capable of performing wireless communication with one another can constitute the communication processing system 1. The number of first processing devices may be 2 or more. Each of the first processing device and the second processing device may be portable or stationary device.

It is to be understood that the configurations of the mobile terminal 2 and the multifunction device 3, the constituent elements thereof, the content, order, and timing of the processing, the content of the communication setting table T1 used for determining whether or not to set at cryptographic communication, and the like can be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. A communication processing system comprising:
   a first processing device; and
   a second processing device; wherein
   the first processing device and the second processing device are configured to perform wireless communication with each other,
   the first processing device includes
      a first communication unit configured to perform, as the wireless communication, cryptographic communication in which encryption and decryption are made based on an encryption key and plaintext communication in which neither encryption nor decryption is made,
      a communication unit controller, and
      a determination portion configured to detect, based on a communication execution command received by the communication unit controller, content of data to be sent and received, and to determine, based on the detected content of data to be sent and received, whether or not communication using the first communication unit is set at the cryptographic communication, wherein the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication, the second processing device includes a second communication unit configured to perform the cryptographic communication and the plaintext communication with the first communication unit of the first processing device, the second communication unit includes a storage portion configured to store encryption key information necessary for the encryption up to a predetermined upper limit of number of pieces, the encryption key information being provided for each of other ends of communication, when the second communication unit performs the cryptographic communication with the first communication unit, the second communication unit performs at least one of the encryption and the decryption based on an encryption key included in the encryption key information corresponding to the first processing device stored in the storage portion, after the second communication unit finishes the cryptographic communication with the first communication unit, the second communication unit performs processing for deleting, from the storage portion, the encryption key information corresponding to the first processing device, and a table of attributes is stored which defines a communication mode for each of a plurality of attributes, and the determination portion makes its determination by finding an attribute of the data to be sent in the table of attributes.

2. The communication processing system according to claim 1, wherein the second processing device further includes a storage area provided outside the second communication unit, the storage area being configured to store one or more pieces of the encryption key information, after the second communication unit finishes the cryptographic communication with the first communication unit, the second communication unit performs the processing for deleting, from the storage portion, the encryption key information corresponding to the first processing device by moving the encryption key information corresponding to the first processing device from the storage portion to the storage area, and when the second communication unit performs again the cryptographic communication with the first communication unit, the second communication unit obtains, from the storage area, the encryption key information corresponding to the first processing device and stores the encryption key information corresponding to the first processing device into the storage portion.

3. The communication processing system according to claim 1, wherein, when a job to be executed by the second processing device is sent as the data, or, when information to be concealed is sent or received as the data, the determination portion determines that the communication using the first communication unit is set at the cryptographic communication.

4. The communication processing system according to claim 1, wherein, when information representing a status of the second processing device is received as the data, the determination portion determines that the communication using the first communication unit is not set at the cryptographic communication.

5. The communication processing system according to claim 1, wherein the second processing device includes an informing portion configured to, when the encryption key information cannot be stored into the storage portion in spite of a request for the cryptographic communication made by the first processing device, use the second communication unit to inform the first processing device that the second processing device is in a state of being incapable of performing the cryptographic communication, and the first processing device is configured to determine whether or not to change the cryptographic communication to the plaintext communication when it is informed by the informing portion that the second processing device is in a state of being incapable of performing the cryptographic communication.

6. The communication processing system according to claim 1, wherein the first communication unit utilizes a single communication protocol.

7. A processing device capable of performing wireless communication with another processing device, comprising:

a communication unit configured to perform, as the wireless communication, cryptographic communication in which encryption and decryption are made based on an encryption key and plaintext communication in which neither encryption nor decryption is made, and to include a storage portion for storing encryption key information necessary for the encryption up to a predetermined upper limit of number of pieces, the encryption key information being provided for each of other ends of communication; wherein when the communication unit performs the cryptographic communication with said another processing device, the communication unit performs at least one of the encryption and the decryption based on an encryption key included in the encryption key information corresponding to said another processing device stored in the storage portion, and after the communication unit finishes the cryptographic communication with said another processing device, the communication unit performs processing for deleting, from the storage portion, the encryption key information corresponding to said another processing device;

the processing device further comprises a storage area provided outside the communication unit, the storage area being configured to store one or more pieces of the encryption key information, wherein after the communication unit finishes the cryptographic communication with said another communication unit, the communication unit performs the processing for deleting, from the storage portion, the encryption key information corresponding to said another processing device by moving the encryption key information corresponding to said another processing device from the storage portion to the storage area, and when the communication unit performs again the cryptographic communication with said another communication unit, the communication unit obtains, from the storage area, the encryption key information corresponding to said another processing device and stores the encryption key information corresponding to said another processing device into the storage portion.

8. The processing device according to claim 7, wherein the communication unit performs the processing for deleting the encryption key information from the storage portion when the communication unit performs the plaintext communication with said another processing device.

9. The processing device according to claim 7, comprising an informing portion configured to, when the encryption key information cannot be stored into the storage portion in spite of a request for the cryptographic communication made by said another processing device, use the communication unit to inform said another processing device that the processing device is in a state of being incapable of performing the cryptographic communication, wherein
when said another processing device makes a request to perform the plaintext communication instead of the cryptographic communication, the processing device performs the plaintext communication with said another processing device.

10. The processing device according to claim 7, wherein the communication unit is a module component complying with standards for Bluetooth (registered trademark) Low Energy.

11. The processing device according to claim 7, comprising an image formation portion configured to, when the communication unit receives a print job sent from said another processing device, perform printing based on the print job.

12. A non-transitory recording medium storing a computer-readable program used in a processing device, the processing device including a communication unit configured to perform, as wireless communication with another processing device, cryptographic communication in which encryption and decryption are made based on an encryption key and plaintext communication in which neither encryption nor decryption is made and to include a storage portion capable of storing encryption key information necessary for the encryption up to a predetermined upper limit of number of pieces, the encryption key information being provided for each of other ends of communication, the computer-readable program controlling the communication unit to perform processing comprising:
for the cryptographic communication with said another processing device, making at least one of the encryption and the decryption based on an encryption key included in the encryption key information corresponding to said another processing device stored in the storage portion, and
after the cryptographic communication with said another processing device, processing for deleting, from the storage portion, the encryption key information corresponding to said another processing device;
the processing device further includes a storage area provided outside the communication unit, the storage area being configured to store one or more pieces of the encryption key information,
the computer-readable program controlling the communication unit to perform
after the cryptographic communication with said another communication unit is finished, the processing for deleting, from the storage portion, the encryption key information corresponding to said another processing device by moving the encryption key information corresponding to said another processing device from the storage portion to the storage area, and
when the communication unit performs again the cryptographic communication with said another communication unit, the communication unit obtains, from the storage area, the encryption key information corresponding to said another processing device and stores the encryption key information corresponding to said another processing device into the storage portion.

13. The non-transitory recording medium according to claim 12, wherein the computer-readable program controls the communication unit to perform the processing for deleting the encryption key information from the storage portion when the communication unit performs the plaintext communication with said another processing device.

14. The non-transitory recording medium according to claim 12, wherein
the processing device includes an informing portion configured to, when the encryption key information cannot be stored into the storage portion in spite of a request for the cryptographic communication made by said another processing device, use the communication unit to inform said another processing device that the processing device is in a state of being incapable of performing the cryptographic communication, and
the computer-readable program controls the communication unit to perform, when said another processing device makes a request to perform the plaintext communication instead of the cryptographic communication, the plaintext communication with said another processing device.

15. The non-transitory recording medium according to claim 12, wherein the communication unit is a module component complying with standards for Bluetooth (registered trademark) Low Energy.

16. The non-transitory recording medium according to claim 12, wherein the processing device includes an image formation portion configured to, when the communication unit receives a print job sent from said another processing device, perform printing based on the print job.

17. A communication processing system comprising:
a first processing device; and
a second processing device; wherein
the first processing device and the second processing device are configured to perform wireless communication with each other,
the first processing device includes
a first communication unit configured to perform, as the wireless communication, cryptographic communication in which encryption and decryption are made based on an encryption key and plaintext communication in which neither encryption nor decryption is made,
a communication unit controller, and
a determination portion configured to detect, based on a communication execution command received by the communication unit controller, content of data to be sent and received, and to determine, based on the detected content of data to be sent and received, whether or not communication using the first communication unit is set at the cryptographic communication, wherein
the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication, the second processing device includes a second communication unit configured to perform the cryptographic communication and the plaintext communication with the first communication unit of the first processing device, the second communication unit includes a storage portion configured to store encryption key information necessary for the encryption up to a predetermined upper limit of number of pieces, the encryption key information being provided for each of other ends of communication, when the second communication unit performs the cryptographic communication with the first communication unit, and when the storage portion does not store the encryption key corresponding to the first processing device, the second communication unit obtains, before starting the cryptographic communication, the encryption key information corresponding to the first processing device to store the encryption key information into the storage portion, when the second communication unit performs the plaintext communication with the first communication unit, the second communication unit performs the plaintext communication without storing the encryption key information corresponding to the first processing device into the storage portion, and a table of attributes is stored which defines a communication mode for each of a plurality of attributes, and the determination portion makes its determination by finding an attribute of the data to be sent in the table of attributes.

18. A non-transitory recording medium storing a computer-readable program used in the first processing device according to claim 17, wherein the program controls:

the first communication unit to perform, as the wireless communication, cryptographic communication in which encryption and decryption are made based on an encryption key and plaintext communication in which neither encryption nor decryption is made, the determination portion to detect, based on a communication execution command received by the communication unit controller, content of data to be sent and received, and to determine, based on the detected content of data to be sent and received, whether or not communication using the first communication unit is set at the cryptographic communication, and to make its determination by finding an attribute of the data to be sent in the stored table of attributes which defines a communication mode for each of a plurality of attributes, and the communication unit controller to control the first communication unit to perform the cryptographic communication when the determination portion determines that the communication using the first communication unit is set at the cryptographic communication, and to control the first communication unit to perform the plaintext communication when the determination portion determines that the communication using the first communication unit is not set at the cryptographic communication.

19. A communication processing system comprising:

a first processing device configured to perform wireless communication with a second processing device;

the first processing device includes a first communication unit configured to perform, as the wireless communication, cryptographic communication in which encryption and decryption are made based on an encryption key and plaintext communication in which neither encryption nor decryption is made, a communication unit controller, and a determination portion configured to detect, based on a communication execution command received by the communication unit controller, content of data to be sent and received, and to determine, based on the detected content of data to be sent and received, whether or not communication using the first communication unit is set at the cryptographic communication, wherein the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication, the first communication unit includes a storage portion configured to store encryption key information necessary for the encryption up to a predetermined upper limit of number of pieces, the encryption key information being provided for each of other ends of communication, when the first communication unit performs the cryptographic communication with the second communication unit, and when the storage portion does not store the encryption key corresponding to the second processing device, the first communication unit obtains, before starting the cryptographic communication, the encryption key information corresponding to the second processing device to store the encryption key information into the storage portion, when the first communication unit performs the plaintext communication with the second communication unit, the first communication unit performs the plaintext communication without storing the encryption key information corresponding to the second processing device into the storage portion, and a table of attributes is stored which defines a communication mode for each of a plurality of attributes, and the determination portion makes its determination by finding an attribute of the data to be sent in the table of attributes.

20. A communication processing system comprising:

a first processing device; and a second processing device; wherein the first processing device and the second processing device are configured to perform wireless communication with each other, the first processing device includes a first communication unit configured to perform, as the wireless communication, cryptographic communication in which encryption and decryption are made based on an encryption key and plaintext communication in which neither encryption nor decryption is made,
a communication unit controller, and
a determination portion configured to determine, based on a communication command received by the communication unit controller, whether or not communication using the first communication unit is set at the cryptographic communication, wherein
the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication,
the second processing device includes a second communication unit configured to perform the cryptographic communication and the plaintext communication with the first communication unit of the first processing device,
the second communication unit includes a storage portion configured to store encryption key information necessary for the encryption up to a predetermined upper limit of number of pieces, the encryption key information being provided for each of other ends of communication,
when the second communication unit performs the cryptographic communication with the first communication unit, the second communication unit performs at least one of the encryption and the decryption based on an encryption key included in the encryption key information corresponding to the first processing device stored in the storage portion,
after the second communication unit finishes the cryptographic communication with the first communication unit, the second communication unit performs processing for deleting, from the storage portion, the encryption key information corresponding to the first processing device, and
a table of attributes is stored which defines a communication mode for each of a plurality of attributes, and the determination portion makes its determination by finding an attribute of the data to be sent in the table of attributes.

21. A communication processing system comprising:
a first processing device; and
a second processing device; wherein
the first processing device and the second processing device are configured to perform wireless communication with each other,
the first processing device includes
a first communication unit configured to perform, as the wireless communication, cryptographic communication in which encryption and decryption are made based on an encryption key and plaintext communication in which neither encryption nor decryption is made,
a communication unit controller, and
a determination portion configured to determine, based on a communication command received by the communication unit controller, whether or not communication using the first communication unit is set at the cryptographic communication, wherein
the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication,
the second processing device includes a second communication unit configured to perform the cryptographic communication and the plaintext communication with the first communication unit of the first processing device,
the second communication unit includes a storage portion configured to store encryption key information necessary for the encryption up to a predetermined upper limit of number of pieces, the encryption key information being provided for each of other ends of communication,
when the second communication unit performs the cryptographic communication with the first communication unit, and when the storage portion does not store the encryption key corresponding to the first processing device, the second communication unit obtains, before starting the cryptographic communication, the encryption key information corresponding to the first processing device to store the encryption key information into the storage portion,
when the second communication unit performs the plaintext communication with the first communication unit, the second communication unit performs the plaintext communication without storing the encryption key information corresponding to the first processing device into the storage portion, and
a table of attributes is stored which defines a communication mode for each of a plurality of attributes, and the determination portion makes its determination by finding an attribute of the data to be sent in the table of attributes.

22. A communication processing system comprising:
a first processing device configured to perform wireless communication with a second processing device;
the first processing device includes
a first communication unit configured to perform, as the wireless communication, cryptographic communication in which encryption and decryption are made based on an encryption key and plaintext communication in which neither encryption nor decryption is made,
a communication unit controller, and
a determination portion configured to determine, based on a communication command received by the communication unit controller, whether or not communication using the first communication unit is set at the cryptographic communication, wherein
the communication unit controller is configured to control the first communication unit to perform the cryptographic communication when the determination portion determines that the communication using the first communication unit is set at the cryptographic communication, and configured to control the first communication unit to perform the plaintext communication when the determination portion determines that the communication using the first communication unit is not set at the cryptographic communication, the first communication unit includes a storage portion configured to store encryption key information necessary for the encryption up to a predetermined upper limit of number of pieces, the encryption key information being provided for each of other ends of communication, when the first communication unit performs the cryptographic communication with the second communication unit, and when the storage portion does not store the encryption key corresponding to the second processing device, the first communication unit obtains, before starting the cryptographic communication, the encryption key information corresponding to the second processing device to store the encryption key information into the storage portion, when the first communication unit performs the plaintext communication with the second communication unit, the first communication unit performs the plaintext communication without storing the encryption key information corresponding to the second processing device into the storage portion, and a table of attributes is stored which defines a communication mode for each of a plurality of attributes, and the determination portion makes its determination by finding an attribute of the data to be sent in the table of attributes.

* * * * *